US009177229B2

(12) United States Patent
Merler et al.

(10) Patent No.: US 9,177,229 B2
(45) Date of Patent: Nov. 3, 2015

(54) KALMAN FILTER APPROACH TO AUGMENT OBJECT TRACKING

(71) Applicant: The Trustees of Columbia University in the City of New York, New York, NY (US)

(72) Inventors: Michele Merler, New York, NY (US); John R. Kender, Leonia, NJ (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 0 days.

(21) Appl. No.: 13/961,610

(22) Filed: Aug. 7, 2013

(65) Prior Publication Data

US 2014/0010456 A1    Jan. 9, 2014

Related U.S. Application Data

(63) Continuation of application No. PCT/US2012/032268, filed on Apr. 5, 2012.

(60) Provisional application No. 61/473,377, filed on Apr. 8, 2011.

(51) Int. Cl.
*G06K 9/00* (2006.01)
*G06K 9/64* (2006.01)
*G06T 7/20* (2006.01)
*H04N 5/225* (2006.01)

(52) U.S. Cl.
CPC . *G06K 9/64* (2013.01); *G06T 7/208* (2013.01); *G06T 2207/10016* (2013.01); *G06T 2207/20076* (2013.01); *G06T 2207/30241* (2013.01)

(58) Field of Classification Search
CPC .................................. G06K 9/00; G06T 7/00
USPC .......... 382/103, 107, 236; 348/154, 155, 169, 348/170, 171, 172
See application file for complete search history.

(56) References Cited

U.S. PATENT DOCUMENTS

| 6,404,900 | B1* | 6/2002 | Qian et al. ..................... 382/103 |
| 2003/0053661 | A1* | 3/2003 | Magarey ....................... 382/103 |
| 2003/0185434 | A1 | 10/2003 | Lee et al. |
| 2004/0186816 | A1 | 9/2004 | Lienhart et al. |
| 2008/0231709 | A1 | 9/2008 | Brown et al. |

OTHER PUBLICATIONS

International Search Report and Written Opinion for PCT/US12/32268, dated Jul. 2, 2012.
Everingham, et al., "Taking the Bite Out of automated Naming of Characters in TV Video", *Image and Vision Computing*, 27:545-559 (2009).
Kalal, et al., "Online Learning of Robust Object Detectors During Unstable Tracking", *3rd On-line Learning for Computer Vision Workshop*, Kyoto, Japan, IEEE CS., 8 pages (2009).

(Continued)

*Primary Examiner* — Abolfazl Tabatabai
(74) *Attorney, Agent, or Firm* — Baker Botts L.L.P.

(57) ABSTRACT

Techniques for tracking one or more objects at each position in an interval in a video input with the use of a Kalman filter, including obtaining a first location estimate of an object with an object detector, obtaining a second location estimate and a movement estimate of the object with an object tracker, determining a final estimate of a position and/or a velocity of the object with the Kalman filter.

17 Claims, 19 Drawing Sheets

(56) References Cited

OTHER PUBLICATIONS

Karlsson, et al., "Human Motion Tracking Using 3D Camera", *Linkopings Universitet*, whole document, retrieved on line Jun. 10, 2010 at http://liu.diva-portal.org/smash/get/diva2:303909/FULLTEXT01.

Mehta, et al., "Real Time Object Detection and Tracking: Histogram Matching and Kalman Filter Approach", *IEEE*, 5:796-801 (2010).

* cited by examiner

Algorithm 1 K-Track

1. Input
   401 — (a) Face track seed $S_t = (x, y, w)$ at frame $t$
   402 — (b) Frame Borders $FB = (0, 0, imageW, imageH)$
   403 — (c) Object Tracker $Tr(x)$, Object Detector $De(x)$
   404 — (d) Weight parameter K (estimated from Eq. 26)
2. Initialize:
   405 — $\hat{x}_t$, $\tilde{x}_t$ and Estimated Position $EP(\hat{x}_t) \leftarrow S_t$
3. Forward:
   406 — While $(EP(\hat{x}_t) \subset FB)$ and $(t \neq shotBound)$
   407 — (a) if $(\exists\ seed\ S_t)$
   408 — (b) $\quad \hat{x}_t \leftarrow S_t$
   409 — (c) else
   410 — (d) $\quad$ compute prediction $\tilde{x}_t \leftarrow Tr(\hat{x}_t - 1)$
   411 — (e) $\quad$ if $(\exists\ observation\ from\ De:\ x_t^o \cap \tilde{x}_t)$
   412 — (f) $\quad\quad \hat{x}_t \leftarrow \tilde{x}_t + K(x_t^o - H\tilde{x}_t)$ (Eq. 19)
   413 — (g) $EP(\hat{x}_t + 1) \leftarrow \hat{x}_t + \hat{\tilde{x}}_t$
   414 — (h) $tEnd = t \leftarrow t + 1$
4. Backward: Repeat Step 3 beginning at $S_t$, but decrementing
   415 — $t$ at each iteration to find $tStart$
   416 — Result: track $T_m = [\ x_{tStart},\ ...,\ x_{tEnd}\ ]$

FIG. 4

KALMAN FILTER APPROACH TO AUGMENT OBJECT TRACKING

CROSS-REFERENCE TO RELATED APPLICATIONS

The present application is a continuation of International Application Serial No. PCT/US2012/032268, filed Apr. 5, 2012 and published in English as WO2012/138828 on Oct. 11, 2012, which claims priority to U.S. Provisional Application Ser. No. 61/473,377, filed Apr. 8, 2011, the contents of which are hereby incorporated by reference in their entireties.

STATEMENT REGARDING FEDERALLY SPONSORED RESEARCH OR DEVELOPMENT

This invention was made with government support under grant No. IIS-0713064, awarded by the National Science Foundation. The government has certain rights in the invention.

BACKGROUND

The presently disclosed subject matter relates to techniques for tracking objects in video.

The rise of unstructured multimedia content on sites such as Youtube has fostered interest techniques to recognize objects and activities in less structured, unconstrained and more realistic domains. Along the same lines, there is interest in automated video surveillance systems that can detect categories of activity in a field of video of a surveillance camera.

Conventional tracking systems typically first detect the location of an object in a video and then subsequently track the location of the object. Certain methods to detect an object include either having a human user first click on the object or using an algorithm to detect an object using a variety of techniques. Once the initial location information is determined, it can be passed to the tracker along with information (e.g., color, size, shape, etc), which then tracks the location of the object throughout successive frames.

However, in certain object tracking systems, lack of structure and to the low quality of the data, particularly in conventional appearance-based trackers, can result in drift, i.e., increasing error as to the trackers prediction of where the object is located as time goes on. Additionally, particularly in the area of surveillance, tracking performance can be important.

Accordingly, there is a need for techniques that enhance tracking performance in tracking objects in a video input.

SUMMARY

Methods and systems for tracking objects in video, and more particularly to methods and systems for tracking objects in a video input with the use of a Kalman filter, are disclosed herein.

In one aspect of the disclosed subject matter, a computer-implemented method for tracking objects at each position in an interval in a video input with the use of a Kalman filter includes a Kalman filter with a noisy measurement component and a noisy predictor component.

In one embodiment, the method can include obtaining a first location estimate of an object at each position in the interval with an object detector. The location estimate can represent the noisy measurement component of the Kalman filter. The method can include obtaining a second location estimate and a movement estimate of an object in the video input at each position in the interval with an object tracker. The object tracker can represent the noisy predictor component of the Kalman filter. A final estimate of position and/or velocity of the object at a future time can then be calculated at each position in the interval using a Kalman filter. The final estimate can be calculated with reference to a Kalman gain. The Kalman gain can indicate a first level of importance of the noisy measurement component of the Kalman filter and a second level of importance of the noisy predictor component of the Kalman filter.

In one embodiment, the Kalman filter can be a steady-state Kalman filter. The Kalman gain can be a predetermined Kalman gain, estimated according to the variance of a errors of the object tracker and object detector. The errors can be calculated with reference to a separate video input.

In some embodiments, the first location estimate, second location estimate, and movement estimate can have any number of dimensions. For example, the location estimate can include an estimate in a two-dimensional Cartesian coordinate system, having an x dimension and a y dimension. The estimates can represents estimates any a space of any dimension.

In some embodiments, the method can include displaying a rendering of the video input and information about the final estimate of position and/or velocity of the object within the video input. For example, the method can include displaying an array of a plurality of frames of the input video, each frame corresponding to one position in the interval. Information about the position and/or velocity of the object can be displayed, for example, as superimposed over a particular frame.

In another aspect of the disclosed subject matter, an object tracking system for tracking objects at a plurality of successive time intervals in a video input with the use of a Kalman filter includes at least one memory for storing the video input and at least one processor.

In one embodiment, the system can include executable code stored in the memory and configured to instruct the processor to obtain a first location estimate of an object in the video input at each position in the interval. The executable code can be configured to instruct the processor to obtain a second location estimate and a movement estimate of an object in the video input at each position in the interval, and to calculate a final estimate of a position and/or velocity of the object at a future time at each position in the interval with the use of a Kalman filter. The first location estimate can represent the noisy measurement component of the Kalman filter, and the second location estimate and the movement estimate can represent the noisy predictor component of the Kalman filter.

The accompanying drawings, which are incorporated and constitute part of this disclosure, illustrate preferred embodiments of the disclosed subject matter and serve to explain the principles of the disclosed subject matter.

BRIEF DESCRIPTION OF THE DRAWINGS

FIG. 4 is a diagram of a method for tracking objects according to another embodiment of the disclosed subject matter.

FIG. 11A, FIG. 11B, and FIG. 111C depict the tracking recall of embodiments of the presently disclosed subject matter and known methods.

DETAILED DESCRIPTION

Figure 1:
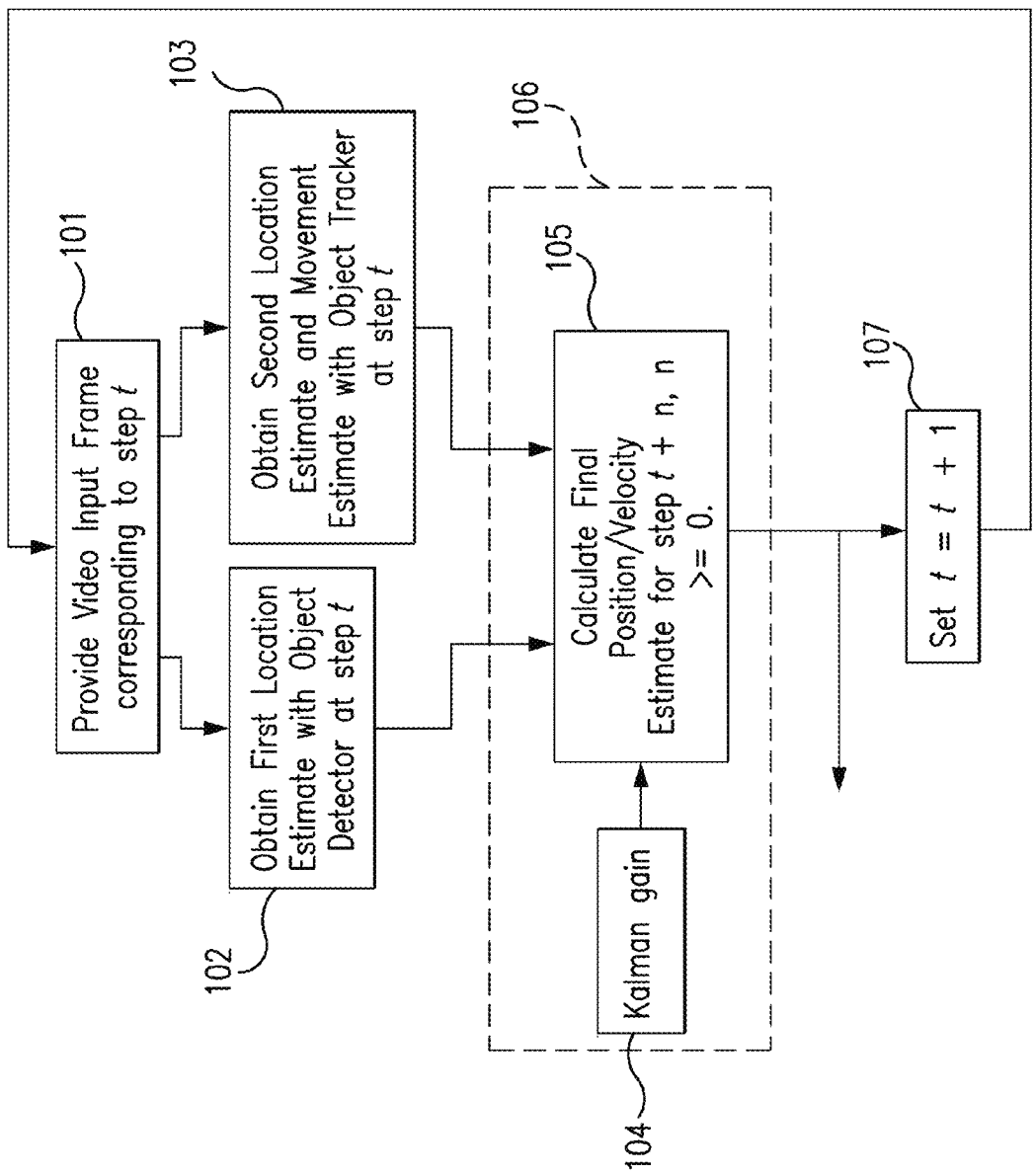
FIG. 1 is a flow diagram of a method for tracking objects according to an exemplary embodiment of the disclosed subject matter.

The systems and methods presented herein are generally directed to methods and systems for tracking objects in a video input, and more particularly to methods and systems for tracking objects in a video input with the use of a Kalman filter.

An object tracker can obtain an estimate of the position or location of an object within a video input. A measurement by the object tracker, however, can be noisy (that is, prone to error). An object detector can predict the position or location, velocity, acceleration, or other attributes of an object in video based on past information about that object. This prediction, however, can be noisy. The presently disclosed subject matter provides techniques to combine the measurement of an object detector and the prediction of an object tracker to obtain a more accurate estimation of the location, velocity, acceleration, or other attribute of an object in a video input. A Kalman can have a noisy measurement component, which can be represented by the measurement of any known object tracker, and a noisy predictor component, which can be represented by any known object predictor. The Kalman gain of the Kalman filter can weight the level of importance of each of the components. For example, if in one frame the measurement of the object tracker is particularly unreliable, the Kalman gain can specify that the Kalman filter should not weight the noisy measurement component as heavily as the noisy predictor component. In some embodiments, as described more fully below, the Kalman gain can be predetermined, in which case the Kalman filter can be referred to as a steady-state Kalman filter. In other embodiments, as described more fully below, the Kalman gain can be calculated dynamically.

As used herein, the term Kalman filter means an algorithm that can estimate the state of $x \in \mathbb{R}^n$ of a process governed by the differential equation:

$$x_t = Ax_{t-1} + Bu_{t-1} + w_{t-1} \quad (1)$$

where the random variable $u \in \mathbb{R}^1$ represents an optional control input, the random variable w represents that process noise, and the matrix A relates to the state at the current time $x_t$ to the previous time position $x_{t-1}$, in the absence of a driving function or process noise. The measurement $x_t^O \in \mathbb{R}^m$ of the state is represented as $x_t^O = Hx_t + v_t$. The random variable v represents measurement noise. Both $w_t$ and $v_t$ are assumed to be white, independent of each other, and have normal probability distributes p(w)~N (0,Q), p(v)~N(0, R). Q and R represent the process noise and the measurement noise covariance matrices, respectively. The Kalman filter state estimate at position t is based on two estimates: the a priori state estimate, given knowledge of the process prior to position t, defined as $\tilde{x}_t \in \mathbb{R}^n$, and the a posteriori state estimate, given the measurement $x_t^O$, defined as $\hat{x}_t \in \mathbb{R}^n$. The a priori and a posteriori estimate errors and their covariances at position t can be defined as $$\tilde{e}_t = x_t - \tilde{x}_t, \hat{e}_t = x_t - \hat{x}_t, \quad (2)$$

and $$\tilde{P}_t = E[\tilde{e}_t \tilde{e}_t^T], \hat{P}_t = E[\hat{e}_t \hat{e}_t^T]. \quad (3)$$

Under these assumptions, it can be shown that the discrete Kalman filter time update equations result in $$\tilde{x}_t = A\hat{x}_{t-1} + Bu_{t-1} \quad (4)$$

and $$\tilde{P}_t = A\hat{P}_{t-1}A^T + Q, \quad (5)$$

and the measurement update equations result in $$K_t = \tilde{P}_t H^T (H\tilde{P}_t H^T + R)^{-1} \quad (6)$$

$$\hat{x}_t = \tilde{x}_t + K_t(x_t^O - H\tilde{x}_t) \quad (7)$$

and $$\hat{P}_t = (I - K_t H)\tilde{P}_t, \quad (8)$$

where $K_t$ is referred to as the Kalman gain.

As referred to herein, a Kalman filter can include both a noisy measurement component, which can interchangeably be referred to as a noisy observation component, and a noisy predictor component, which can interchangeably be referred to as a noisy prediction component. In the above definition, the noisy measurement component is given by $x_t^O$ and the noisy predictor component is given by $\tilde{x}_t$.

Additionally, as used herein, the term "location" and "position" can be used interchangeably to mean the location or position of an object within an input video or coordinate system, unless the context indicates otherwise.

A general object tracking problem can be considered in the framework of a Kalman filter which has reached the equilibrium stage of its prediction/observation recurrence. Those skilled in the art will understand suitable frameworks, and exemplary frameworks are disclosed in, e.g., B. Friedland, *Optimum Steady-state Position and Velocity Estimation Using Noisy Sampled Position Data*, IEEE AES 9 (6) (1973) 906-911. K. Ramachandra, *Kalman Filtering Techniques for Radar Tracking*, Marcel Dekker, New York, revises this general framework.

In one aspect of the disclosed subject matter, a computer-implemented method for tracking objects at each position in an interval in a video input with the use of a Kalman filter includes using a Kalman filter with a noisy measurement component and a noisy predictor component.

In one embodiment, the method can include obtaining a first location estimate of an object in the video input at each position in the interval with an object detector. The first location estimate represents the noisy measurement component in the Kalman filter. The method can include obtaining a second location estimate and a movement estimate of the object in the video input at each position in the interval with an object tracker, wherein the second location estimate and movement estimate represent the noisy predictor component in the Kalman filter. The method can include calculating a final estimate of a position and/or a velocity of the object at a future time at each position in the interval with the Kalman filter. Each final estimate can be calculated with reference to a Kalman gain which indicates a first level of importance of the noisy measurement component and a second level of importance of the noisy predictor component.

Figure 2:
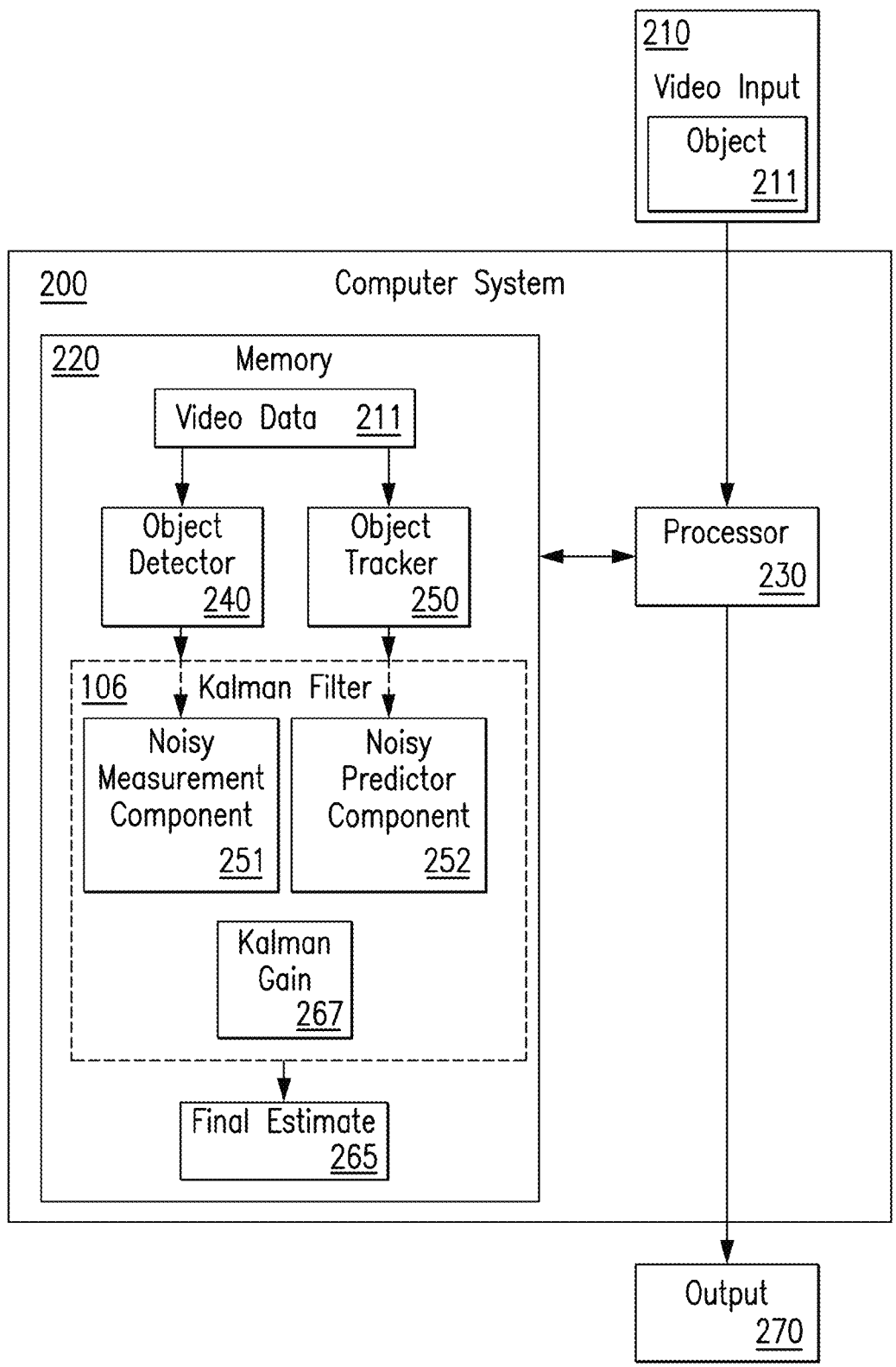
FIG. 2 depicts a computer system having an object tracking system in accordance with an embodiment of the disclosed subject matter.

FIG. 1 and FIG. 2 provide a is a flow diagram that illustrates the method for tracking objects according to an exemplary embodiment of the disclosed subject matter and a computer system having an object tracking system in accordance with an embodiment of the disclosed subject matter, respectively.

With reference to FIG. 1, the method of some embodiments can include providing a video input that contains at least one object. The video input can comprise video data that can correspond, for example, a plurality of frames. The object can be any object that is desired to be tracked for which an object detector can be provided. For example, the object can be a human face, the full body of a person, a bottle, a ball, a car, an airplane, a bicycle, or any other object in an image or video frame for which an object detector can be created.

The method can include tracking an object at each position in the interval in the video input. The interval can be, for example, a set of successive numbers corresponding to particular frames in the video input. Each number in the interval is referred to herein as a position, and is variably referred to as position t. The interval can be defined as, for example, starting at position 0, where position 0 corresponds to the first frame in the video in which object tracking is to take place. Position 1 would thus correspond to the next frame in the video in which object tracking is to take place. The set of successive numbers can, for example, correspond to each and every frame in the video input. Alternatively, the positions in the interval can correspond to a sampling of frames in the video input. For example, the successive time interval can be defined as every third frame. In another alternative, the positions in the interval can be arbitrary times at which object tracking is to take place that may or may not correspond to a multiple of frames. For example, if a computer has an internal clock, the positions can correspond to ticks on the internal clock.

As illustrated in FIG. 1, starting at position t=0, a frame of the video input corresponding to position t is first provided (step 101). The object detector can obtain a first location estimate (step 102) of the object contained in the video input at position t. The first location estimate can represent the noisy measurement component of the Kalman filter. The object detector can be any object detector, including, for example a general appearance-based object detector. An object tracker can obtain a second location estimate and movement estimate (step 103) of the object contained in the video input at position t. The second location estimate and the movement estimate can represent the noisy predictor component of the Kalman filter. The object tracker can be any object tracker, including, for example, MIL Tracker, disclosed in B. Babenko, M.-H. Yang, and S. Belognie, *Visual Tracking with Online Multiple Instance Learning*, CVPR (2009), which is hereby incorporated by reference in its entirety, the PROST Tracker, disclosed in J. Santner, C. Leistner, A. Saffari, T. Pick, and H. Bischof, *PROST: Parallel Robust Online Simple Tracking*, CVPR 723-730 (2010), which is hereby incorporated by reference in its entirety, or the tracker disclosed by Everingham et al, *Taking The Bite Out Of Automated Naming of Characters In TV Video*, Image and Vision Computing, 27(5):545-559 (2009), which is hereby incorporated by reference in its entirety.

A final estimate of position and/or velocity of the object at a position can be calculated (step 105) at position t with the use of a Kalman filter 106. A Kalman gain 104 can be used to weight the importance of the noisy measurement component and noisy predictor component of the Kalman filter 106. The Kalman filter can be a general Kalman filter. Alternatively, in some embodiments, the Kalman filter can be a steady-state Kalman filter (i.e, the Kalman gain can be predetermined).

Positions 101 through 106 can then be repeated at each position in the interval. That is, the position t can be increased to the next position t+1 (step 107). Steps 101 through 106 can then be applied to the frame in the video input corresponding to position t+1.

The method depicted in FIG. 1 can be embodied in a computer program product that can be stored on a non-transitory computer readable storage device. The storage device can comprise, for example, a hard drive, a solid state drive, a CD, a DVD, a flash drive, magnetic tape, a web server, or the like.

With reference to FIG. 2, a description of a computer system configured for object tracking according to an embodiment of the presently disclosed subject matter will be described. The system depicted in FIG. 2 can carry out the method depicted in FIG. 1. The system can include a processor 230 in communication with a memory 220.

The system can include providing video data 211 of the video input 210 containing at least one object 211, the video data corresponding to a frame of video that corresponds to a position t. In some embodiments, the video input 210 can include a plurality of frames. The video data 211 that makes up the frames can be stored in a memory 220, for example in random access memory with the use of the processor 230 and accompanying I/O functionality. The video data 211 stored in the memory can comprise all of the data for the video input 210, for example, in a situation in which the video input 210 is pre-recorded video. Alternatively, the video data 211 can comprise one or more frames of the video input 210, for example, in a situation in which video is being captured by a video capture device and streamed in real time to the computer system 200.

An object detector 240 can obtain a first location estimate at position t. An object tracker 250 can obtain a second location estimate and a movement estimate at position t. The first location estimate can represent the noisy measurement component 251 of the Kalman filter 106, and the second location estimate and movement estimate can represent the noisy predictor component 252 of the Kalman filter 106. A final estimate 265 of position and/or velocity of the object at a future time t+n, where n>0 can be calculated at each position t with a Kalman filter 260. The final estimate can be calculated with reference to a Kalman gain 267.

Although FIG. 2 has been described above as including particular components, the system of FIG. 2 can include any combination of any of the described components and any of the options or features described herein, as would be understood by one of ordinary skill in the art. For example, any of the options or features described herein can be utilized in combination with the illustrated embodiments of FIG. 2 and/or any number of the other options or features also described herein as would be understood by one of ordinary skill in the art.

In some embodiments, the Kalman filter can be a general Kalman filter. For purposes of illustration, and not limitation, description will now be made, with reference to FIG. 3, to an embodiment of the presently disclosed subject matter that uses a steady-state Kalman filter. For a steady-state Kalman filter, the Kalman gain is predetermined (step 302) with the use of, for example, at least one separate video sequence 301. That is, the Kalman gain can be estimated beforehand according to the variances of predictor and detector errors on a separate set of videos.

In this embodiment, the object tracker 250 can be the generic appearance-based MIL Tracker. Note that in other embodiments, the object tracker 250 can be, for example, the PROST Tracker, the tracker disclosed in Everingham, et al., or others. Each component of the object position can considered to be independently measured by the detector in the Cartesian coordinate system with constant accuracy, and the observation errors can have zero mean and can be uncorrelated.

The a priori estimate $\tilde{x}_t$ can be associated with the object tracker 250, since the tracker represents a prediction based on the past state of the object. In this framework, the a priori estimator can try to predict at each position t the position of the tracked object and also its velocity.

The measurement $x_t^O$ of the filter can be associated with an object detector 240, since the detector, just like a measurement, is based solely on an observation at the current position, and does not have any relationship with past states. In this embodiment, let m=n.

In the Kalman framework of this embodiment, $x=(x,\dot{x},y,\dot{y})^T \in \mathbb{R}^4$, where $\dot{x}$ and $\dot{y}$ represent the velocity of the object in the x and y direction, respectively. The x and y coordinates can be considered to be independent, therefore the following analysis can be done on a single dimension, with $x=(x,\dot{x})^T \in \mathbb{R}^2$. The accuracy of position and velocity estimates at each moment t depends not only upon the sensor accuracy, but also upon the perturbing acceleration a, which is a random constant between successive observations. This random constant can be assumed to have zero mean and to be uncorrelated with the acceleration at other intervals, therefore the only statistic that needs to be estimated about is its constant variance $\sigma_a^2$. The motion of the tracked object in a time interval T can then be described by the following Equations:

$$x_t = x_{t-1} + \dot{x}_{t-1}T + 0.5 a_{t-1} T^2 \qquad (9)$$

and $$\dot{x}_t = \dot{x}_{t-1} + a_{t-1} T. \qquad (10)$$

Unit time intervals can be considered (T=1), and thus $$x_t = \begin{bmatrix} 1 & 1 \\ 0 & 1 \end{bmatrix} x_{t-1} + \begin{bmatrix} 0.5 \\ 1 \end{bmatrix} a_{t-1} = A x_{t-1} + G a_{t-1},$$

which represents the mapping of the standard Kalman Equation to the specific framework employed in this embodiment. The measurement noise w=Ga can be assumed to be white and have normal probability distribution $$p(w) \sim N(0,Q) = N(0, GG^T \sigma_a^2).$$

The measurement $x_t^O$ of the state of a single coordinate can be represented as $x_t^O = H x_t + v_t$, where H=[1, 0], since at each observation only the position of the tracked object is measured, not its velocity. It follows that m=1 and $x_t^O \in \mathbb{R}^1$. The random variable v can represent measurement noise. Like w, v can be assumed to be white, independent from w, and to have normal probability distribution $p(v) \sim N(0,Q) = N(0, GG^T \sigma_o^2)$ represents the variance of the observation error, and is a scalar. The a priori and a posteriori covariance matrices $\tilde{P}_t$ and $\hat{P}_t$ are then [2×2] symmetric matrices, and in the steady state $\tilde{P}_t = \tilde{P}$ and $\hat{P}_t = \hat{P}$. The Kalman filter time and measurement update Equations can thus become $$\tilde{x}_t = A\hat{x}_{t-1} = \text{MILTrack}(\hat{x}_{t-1}), \qquad (11)$$

$$\tilde{P} = A\hat{P}A^T + G\sigma_a^2 G^T \text{ and} \qquad (12)$$

$$K = \tilde{P} H^T (H \tilde{P} H^T + R)^{-1}, \qquad (13)$$

$$\hat{x}_t = \tilde{x}_t + K(x_t^O - H\tilde{x}_t), \qquad (14)$$

$$\hat{P} = (I - KH)\tilde{P}, \qquad (15)$$

where now $K = (K_1, K_2)^T$ has dimension [2×1].

Note that it can be assumed that the MIL tracker 250 predicts following a linear model in position and velocity. This approximation can be shown as $$\tilde{x}_t = \begin{bmatrix} \tilde{x}_t \\ \tilde{x}_t - \hat{x}_{t-1} \end{bmatrix} = \text{MILTrack}(\hat{x}_{t-1}) \approx A\hat{x}_{t-1}.$$

Following the normal probability distribution for p(w) above, The Kalman filter time and measurement update Equations can be rewritten as $\hat{P}^{-1} = \tilde{P}^{-1} + H^T R^{-1} H$ and $\hat{P} - G\sigma_a^2 G^T = A(\hat{P}^{-1} + H^T R^{-1} H)^{-1} A^T$. $\hat{P}$ can be defined as $$\hat{P} = \begin{bmatrix} p_1 & p_2 \\ p_2 & p_3 \end{bmatrix},$$

and thus $$\begin{bmatrix} p_1 - \frac{\sigma_a^2}{4} & p_2 - \frac{\sigma_a^2}{2} \\ p_2 - \frac{\sigma_a^2}{2} & p_3 - \sigma_a^2 \end{bmatrix} = \frac{1}{1+\frac{p_1}{\sigma_o^2}} \begin{bmatrix} p_1 + 2p_2 + p_3 + \frac{\Delta}{\sigma_o^2} & p_2 + p_3 + \frac{\Delta}{\sigma_o^2} \\ p_2 + p_3 + \frac{\Delta}{\sigma_o^2} & p_3 + \frac{\Delta}{\sigma_o^2} \end{bmatrix},$$

with $\Delta = p_1 p_3 - p_2^2$ being the determinant of $\tilde{P}$. From this the following system of Equations can be obtained:

$$\begin{cases} \left(p_1 - \frac{\sigma_a^2}{4}\right)\left(1 + \frac{p_1}{\sigma_o^2}\right) = p_1 + 2p_2 + p_3 + \frac{\Delta}{\sigma_o^2} \\ \left(p_2 - \frac{\sigma_a^2}{2}\right)\left(1 + \frac{p_1}{\sigma_o^2}\right) = p_2 + p_3 + \frac{\Delta}{\sigma_o^2} \\ (p_3 - \sigma_a^2)\left(1 + \frac{p_1}{\sigma_o^2}\right) = p_3 + \frac{\Delta}{\sigma_a^2} \end{cases},$$

which, solving and substituting, can produce the following notations of $\hat{P}$, $\tilde{P}$, and K:

$$\tilde{P} = \begin{bmatrix} \frac{\sigma_o^2 d(d+1)^2}{r^2} & \frac{\sigma_o \sigma_a (d+1)^2}{2r} \\ \frac{\sigma_o \sigma_a (d+1)^2}{2r} & \frac{\sigma_a^2 d(d+1)}{2} \end{bmatrix}, \qquad (16)$$

-continued $$\hat{P} = \begin{bmatrix} \frac{\sigma_o^2 d(d-1)^2}{r^2} & \frac{\sigma_o \sigma_a (d-1)^2}{2r} \\ \frac{\sigma_o \sigma_a (d-1)^2}{2r} & \frac{\sigma_a^2 d(d-1)}{2} \end{bmatrix}, \quad (17)$$

and $$K = \begin{bmatrix} \frac{d(d-1)^2}{r^2} \\ \frac{2(d-1)^2}{r^2} \end{bmatrix}, \quad (18)$$

with $r = \frac{4\sigma_o}{\sigma_u}$ and $d = \sqrt{1+2r}$.

The above can demonstrate a closed form solution for K in terms of the constant error variances $\sigma_a$, on the prediction of the object's acceleration, and $\sigma_o$, on the position measured by the detector 240. Therefore, the position and the velocity of the object at time t can be predicted according to the following equations:

$$\hat{x}_t = K_1 x_t^O + (1-K_1)\tilde{x}_t \quad (19)$$

and $$\hat{\dot{x}}_t = \dot{\tilde{x}}_t + K_2(x_t^O - \tilde{x}_t), \quad (20)$$

where $K_1$ 321a and $K_2$ 312b are elements of the matrix K, representing the filter gain 267 with respect to position and velocity.

In other words, the $K_1$ 321a and $K_2$ 312b represent a relative weighting of the noisy measurement component and noisy predictor component of the Kalman filter, such that prediction and measurement information can be combined. The Kalman gain 267 and its components $K_1$ 321a and $K_2$ 312b can be predetermined (step 302) with the use of at least one separate video sequence 301 and derived based on the error variances $\sigma_a$, on the prediction of the object's acceleration by the predictor 250, and $\sigma_o$, on the position measured by the detector 240.

A frame of the video input corresponding to position t can be provided (Step 310). The object detector 240 can obtain (step 320) a first location estimate 322 of the object in the frame corresponding to position t. This first location measurement can include both an x coordinate 321a and a y coordinate 321b in a Cartesian space. The object tracker 250 can obtain (step 330) a second location estimate 332 and movement estimate 333 of the object in the frame corresponding to position t. The movement estimate can include an estimate of the object's velocity, acceleration, or other movement characteristic or combination thereof of the object. The second location estimate 332 and movement estimate 333 can have both an x coordinate 331a and a y coordinate 331b in a Cartesian space.

The first location estimate 322 of the object detector and the second location estimate 332 and movement estimate 333 of the object tracker can represent the noisy measurement component and the noisy predictor component of the Kalman filter, respectively. That is, the Kalman filter can account for the weight to attribute to the first location estimate 322 with the use of the Kalman gain component 312a and can account for the weight to attribute to the second location estimate 332 and movement estimate 333 with the use of the Kalman gain component 312b. Using the equations $\hat{x}_t = K_1 x_t^O + (1-K_1)\tilde{x}_t$ and $\hat{\dot{x}}_t = \dot{\tilde{x}}_t + K_2(x_t^O - \tilde{x}_t)$ (equations 19 and 20), the Kalman filter can calculate a final position/velocity estimate 342 (step 340) at position t for a position given by t+n, n>=0.

Thereafter, the position time can be increased to the next position in the interval (step 350) (i.e., t=t+1), and steps 310 through 350 can be repeated for the frame corresponding to position t+1.

Another embodiment is depicted in FIG. 4, and will now be explained in detail for purposes of illustration and not limitation. The video input can be an unedited and unstructured video input, for example, a video of a presentation. The object to be tracked can be, for example, a human face. The video input can be segmented into shots, for example with the use of a loose shot boundaries detector. The loose shot boundaries detector can split each frame into 9×5 regions and thresholding mean gray scale difference between corresponding regions in frames separated by a position s=3 frames.

In this embodiment, a method can be applied 401 to find face tracks seeds, that is, to find faces where to initialize the tracker. For example, the skin tone color filter disclosed in Gomez et al., *Automatic Feature Construction and a Simple Rule Induction Algorithm for Skin Detection*, Proc. of the ICML Workshop on Machine Learning in Computer vision, 31-38 (2002), which is hereby incorporated by reference, can be applied, which identifies a pixel as skin or not skin. Those skilled in the art will appreciate that alternative techniques can readily be applied. With the object detector 240, a seed can be established for a face track.

Once the seed has been established for a face track, tracking the face in both temporal directions can be started, until the track exits the frame borders or one of the detected shots boundaries is encountered (401, 406).

Figure 5:
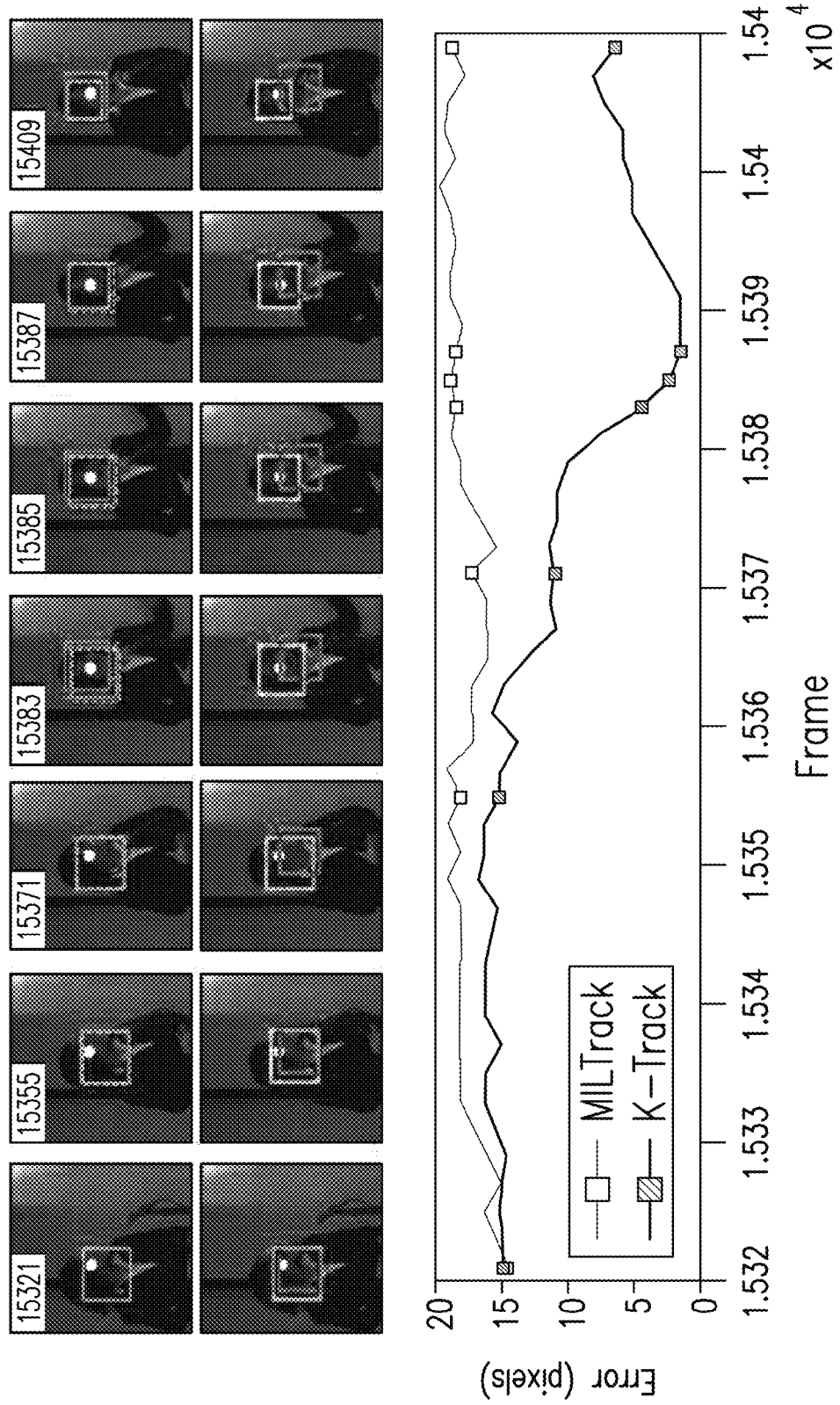
FIG. 5 illustrates the error observed in tracking an object according to an embodiment of the disclosed subject matter relative to a known method of tracking an object.
Figure 6A:
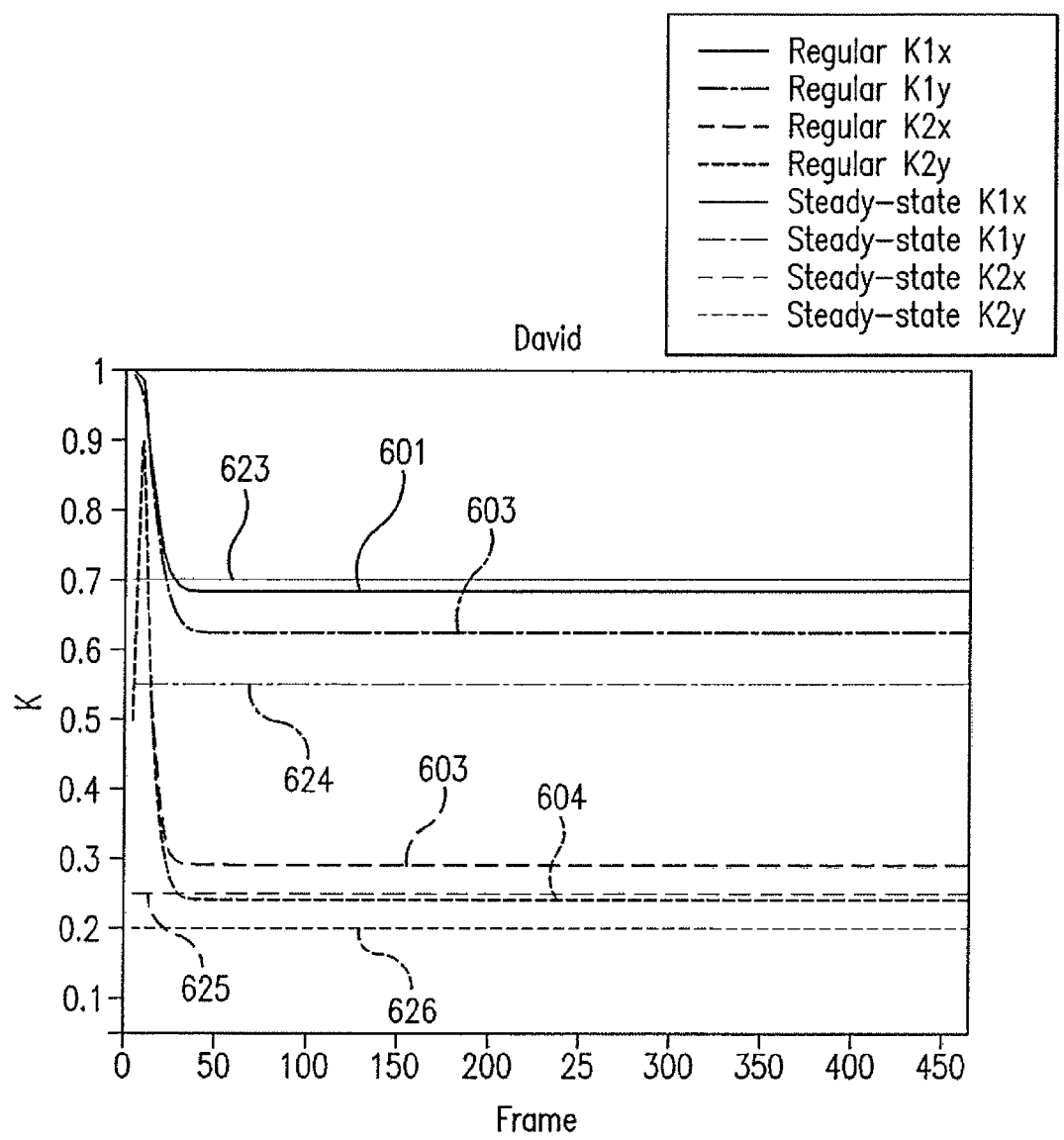
FIG. 6A, FIG. 6B, FIG. 6C, FIG. 6D, and FIG. 6E illustrate the Kalman gain estimate derived from a set of sequences according to an embodiment of the disclosed subject matter.
Figure 6B:
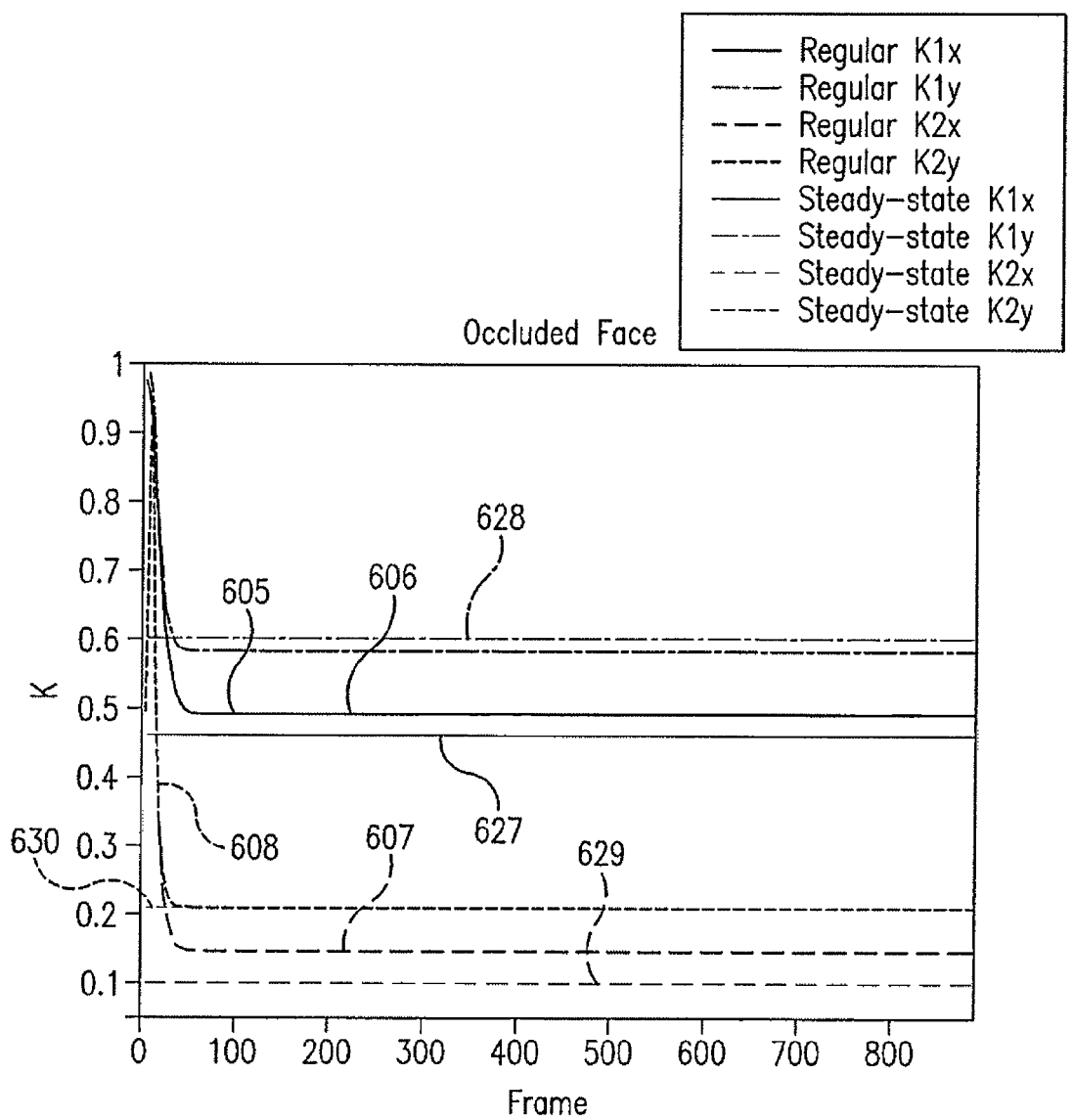
Figure 6C:
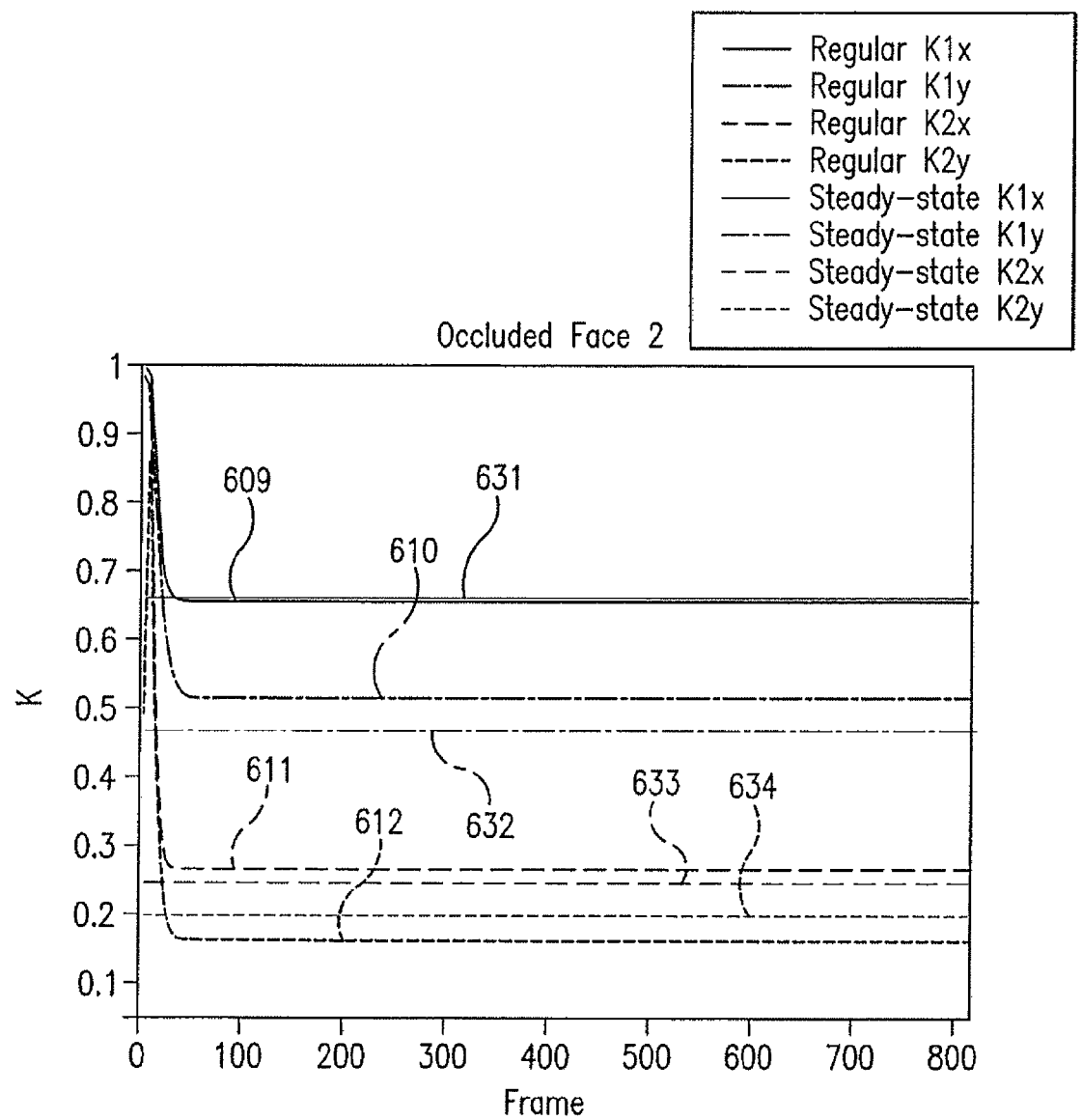
Figure 6D:
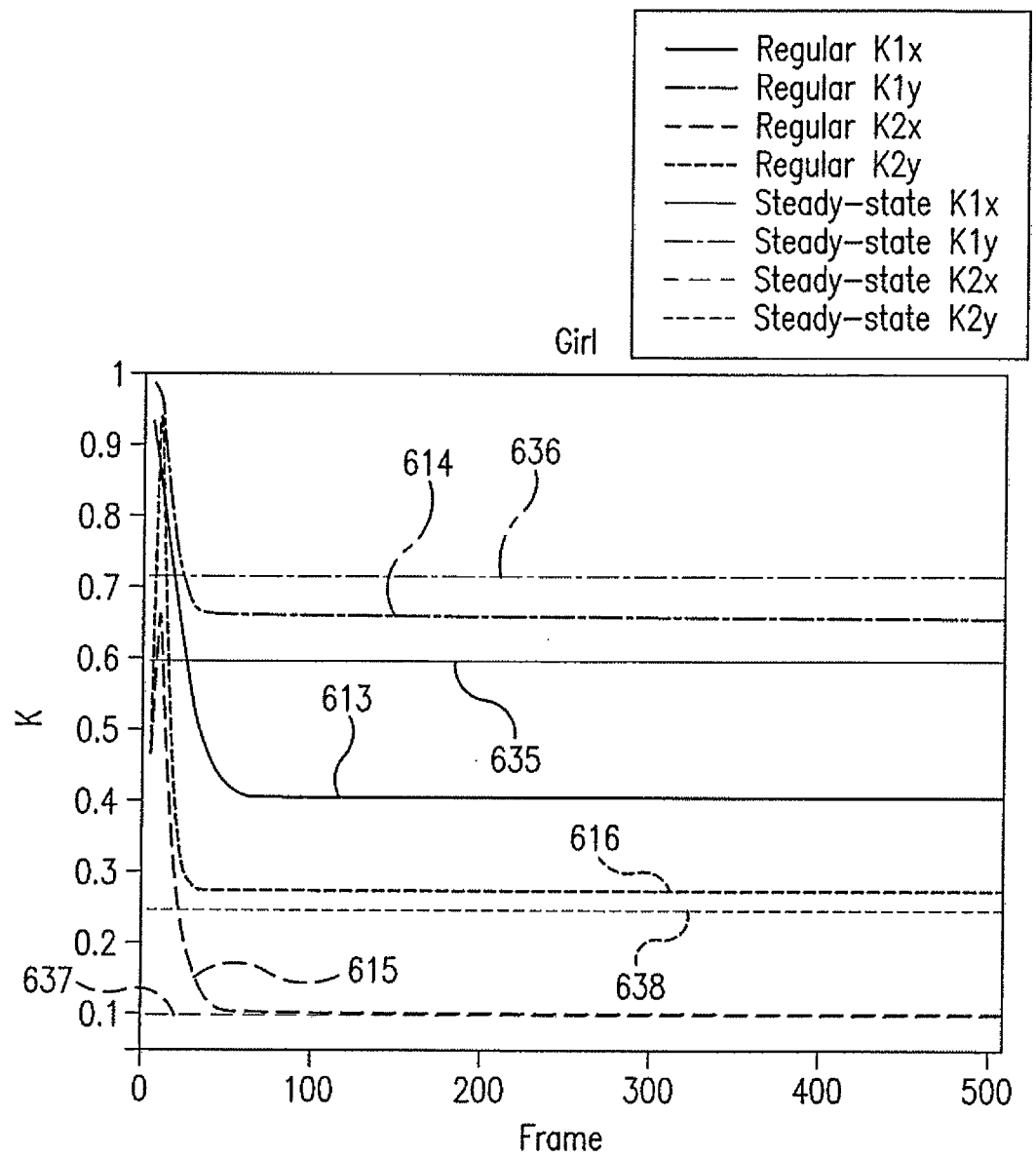
Figure 6E:
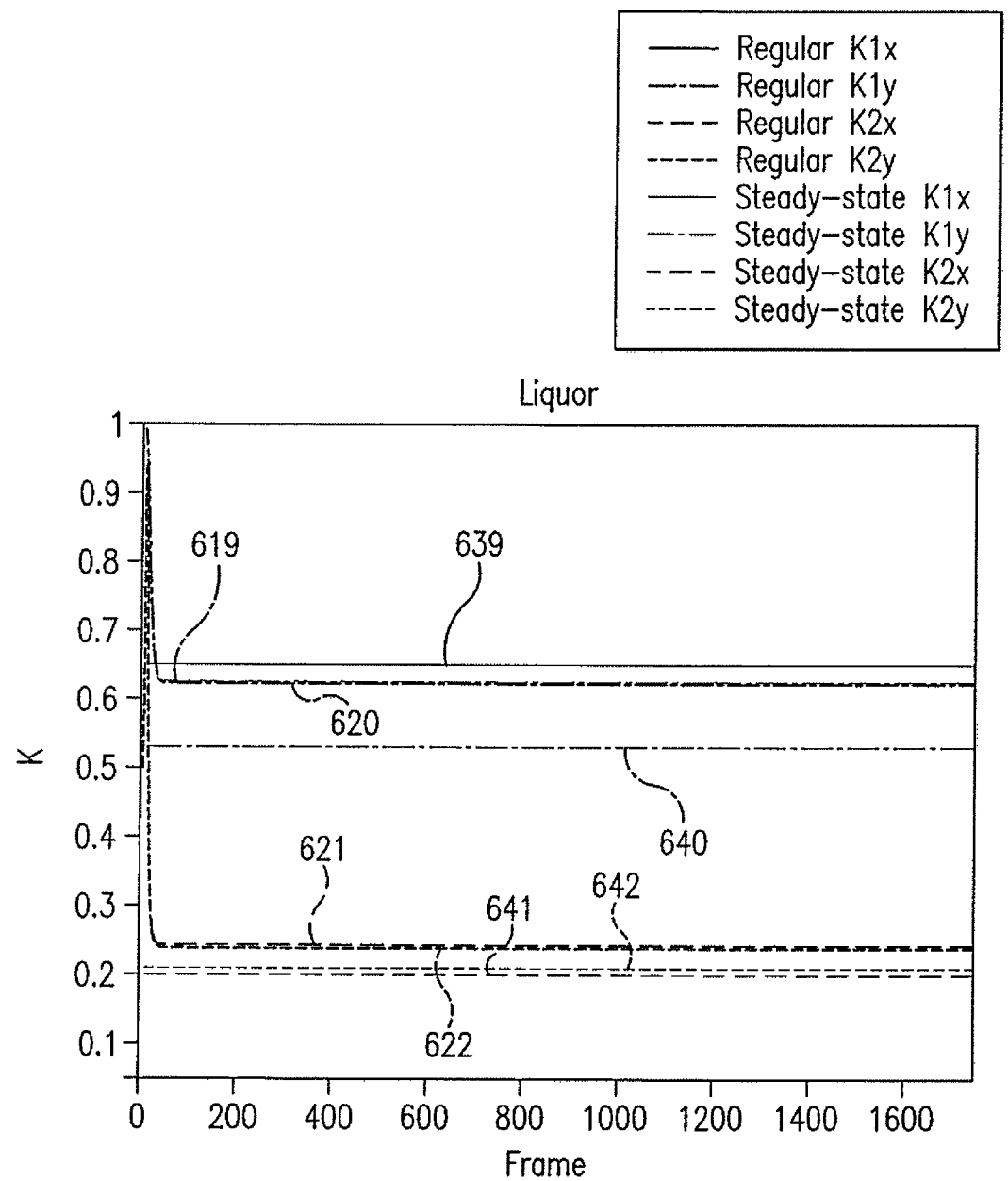
Figure 7A:
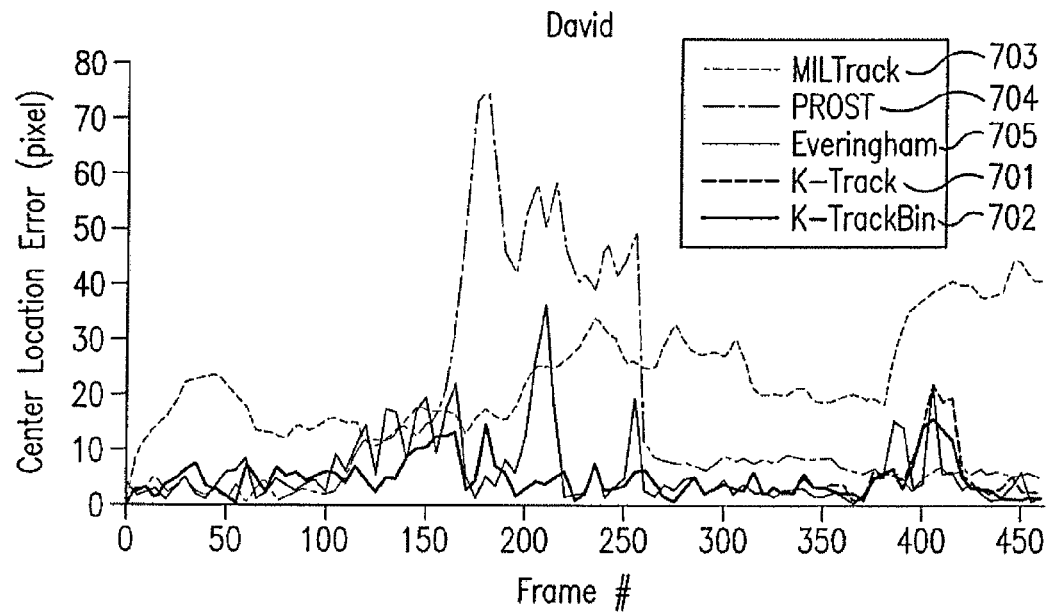
FIG. 7A, FIG. 7B, FIG. 7C, and FIG. 7D depict a comparison of tracking precision of the method according to embodiments of the disclosed subject matter and known methods.
Figure 7B:
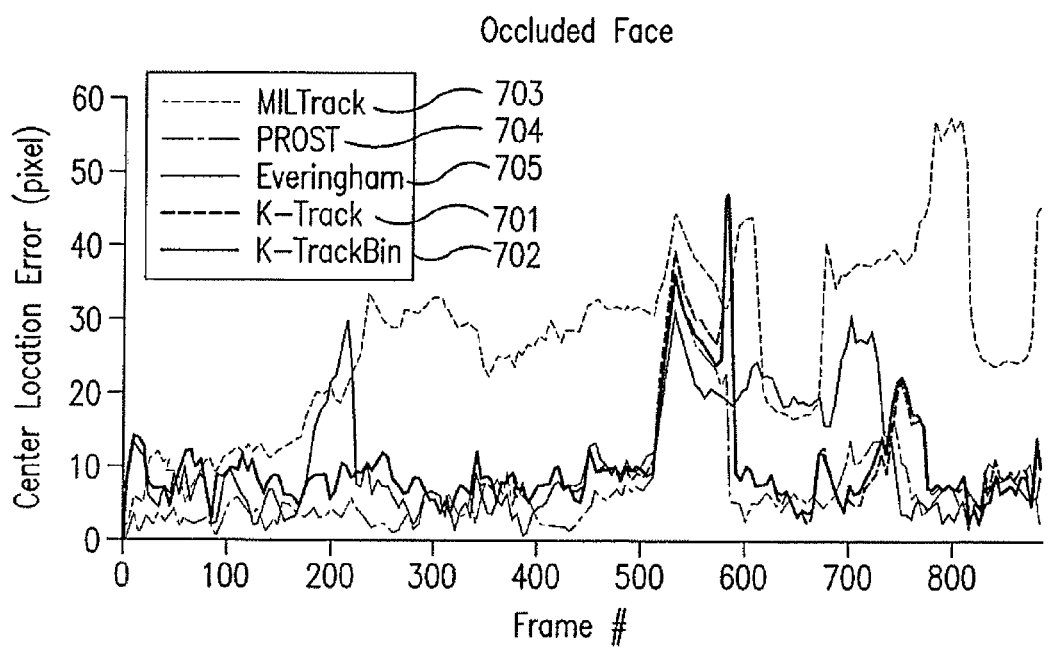
Figure 7C:
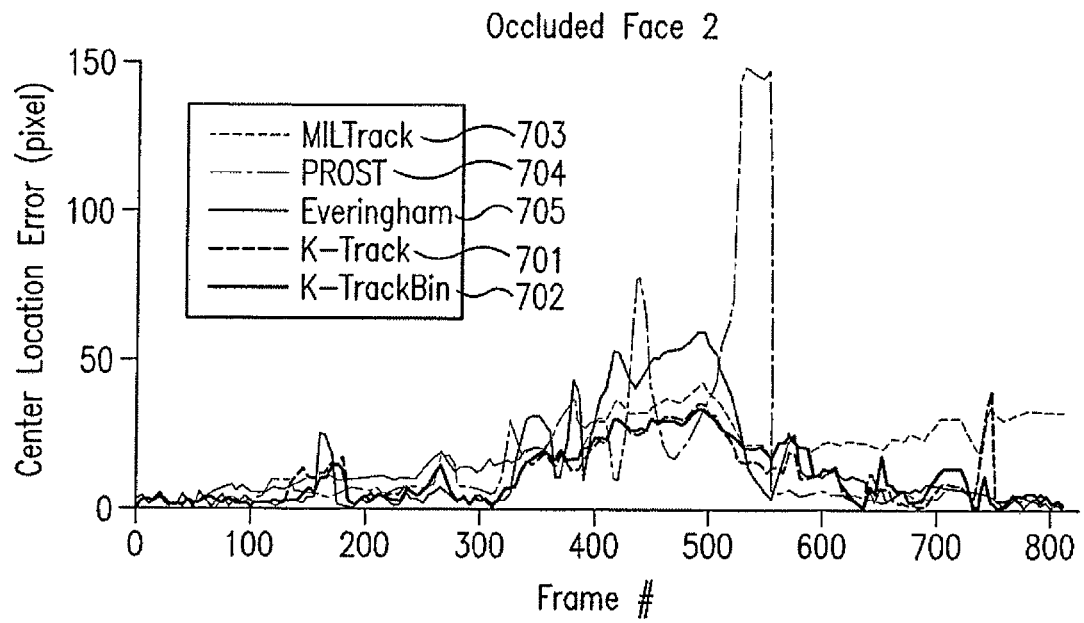
Figure 7D:
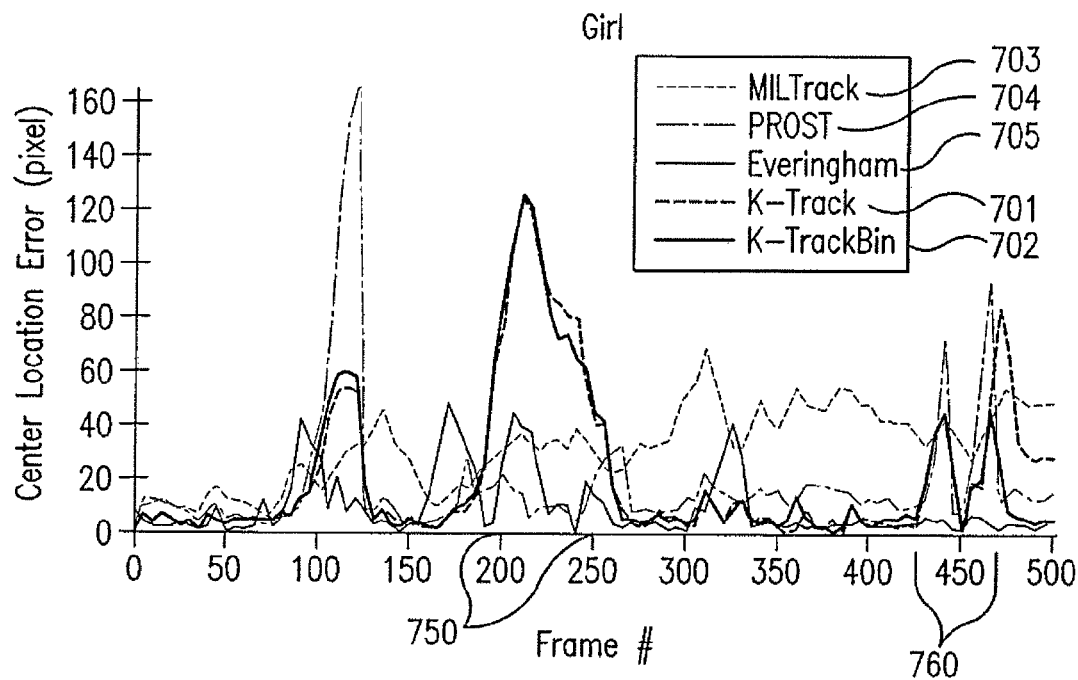

In this embodiment, the object tracker can be the MIL Tracker (403). At each frame t, the tracker extracts two sets of image patches around the tracked face location from the previous frame $x_{t-1}$=(x,y,w): $X^r$ and $X^{r/\beta}$. Patches in $X^r$ are taken in any direction such that their Euclidean distance from $x_{t-1}$ is smaller than a radius r, and are inserted into one positive bag. Multiple negative bags for the MILTracker appearance model are filled with patches $X^{r/\beta}$ from an annular region of radius rn such that $r \le rn \to \beta$. The motion model of the tracker can assume that any position within a radius s from the location of the previous frame is equally likely. Then the estimated position of the tracker $x_t$ can be chosen such that it can maximize the log-likelihood of bags in the appearance model. Note that MILTrack can still be affected by the drifting effect, as shown in FIG. 5. Therefore the tracker can be integrated into the disclosed Kalman filter technique, as described in FIG. 4, which can be a simplified version of the Kalman filter. The method can begin at a track seed 401, and initialize MILTrack with the seed 405. The seed can also represent the first element in the track $x_{tStart}$. At each frame t, if still within the loose shot boundaries determined as described above and the predicted position of the tracked region (computed using its estimated velocity at frame t−1) is not outside the frame 406, the tracking position can be proceeding with.

In case the frame contains a track seed $S_t$ 407, the tracking process can be re-initialized on $S_t$ 408, as the confidence of being correctly on target in a track seed can be high. Otherwise, if the object detector finds a region $x^o$ overlapping the output of MILTrack $\tilde{x}_t$=(x,y,w) $\tilde{x}_t$=(x,y,w) 411, the general K-Tracker position can be updated according to Equation 19 413. The position of the object in the next frame can be estimated based on the current position and velocity 413, to determine if the object will exit the frame at step t+1. Finally, the end point $t_{End}$ of the current track can be incremented to t+1 414, and the system can progress to analyze the next frame. The final result can be a sequence of tracked locations $x_{tStart}, \ldots, x_{tEnd}$, one per frame 416. If the input video is prerecorded, not streaming, the system can alternatively perform tracking in reverse temporal order 415, starting from a track seed.

EXAMPLE

Examples have been performed on two video sets to test the performances of the techniques disclosed herein. The first set, which is denominated Standard, utilizes five publicly available short video sequences which have been extensively used to evaluate state of the art tracking algorithms. The second set, named Presentations, contains three different videos of student presentations taken from a University course.

In all examples the MILTrack is used as the predictor Tr(x) 403. The MILTrack algorithm is used in its default implementation, with r=5 and β=50, which is publicly available at http://vision.ucsd.edu/!bbabenko/data/MilTracker-V1.0.zip. In face sequences the Viola Jones face detector is adopted (applied with the default parameters of the OpenCV implementation, available at http://opencv.willowgarage.com) to be De(x) 403. For the Liquor sequence, object is detected by matching SIFT features from a reference image (downloaded from the web) in each frame, and estimating its bounding box by computing the affine transformation between the matching points. Such an approach (shown in FIG. 6(*a*)) is a know technique for object detection. For example, such techniques are disclosed in Q Fan et al., *Robust Spatio-temporal Matching of Electronic Slides to Presentation Videos*, IEEE Transactions on Image Processing, 2011, Paolo Piccinini et al., *Multiple Object Detection for Pick- and -Place Applications*, IAPR Conference on Machine Vision Applications, 2009, M. Merler, et al., *Recognizing Groceries in situ Using in vitro Training Data*, CVPR SLAM Workshop, 2007, and Stefan Zickler et al., *Detection and Localization of Multiple Objects*, 6th IEEE-RAS International Conference on Humanoid Robots, 2006.

In all examples comparison is made against two baselines. The first baseline is formed by the state of the art general purpose trackers MILTrack and PROST. The second baseline compared against is the track-by-detection algorithm disclosed by Everingham et al. which is class-specific.

The five sequences in the Standard set used for this set of examples are David Indoor (462 frames), Occluded Face (886 frames), Occluded Face 2 (812 frames), Girl (502 frames) and Liquor (1741 frames). Each sequence presents a number of challenges for tracking algorithms in terms of illumination changes, 3D motion, occlusions, moving camera and scale. For the Standard set, the loose shot boundaries detector disclosed herein was not applied.

All video frames in the five sequences are grayscale and were resized to 320×240 pixels. For all the sequences, the ground truth object center and bounding box every 5 frames were used which are publicly available, the estimation process operated only on the (x; y) coordinates of the center of the region of interest, and size of the object bounding box was fixed.

Since the ground truth of the inspected standard sequences is offered only as fixed bounding boxes, the scale were kept fixed. However, the algorithm disclosed in FIG. 4 is extendable to include scale estimations using the same Kalman framework (both MILTrack and VJ offer multiple scale outputs).

According to techniques disclosed herein, the coordinates can be considered to be independent from each other, and variances $\sigma_o$ and $\sigma_a$ of the measurement and prediction errors respectively were independently estimated for x and y. For each of the four face tracking sequences, K was computed from the $\sigma_o$ and $\sigma_a$ estimated on the other three sequences, while for the Liquor sequence the estimates from all four other clips was used. According to the integration of the tracker (predictor) in the Kalman framework, $\sigma_a$ refers to the acceleration of the ground truth object across frames, while $\sigma_o$ refers to the variance of the detection error. From the sequences values of $\sigma_a$ were estimated, ranging from 1 to 2.48 pixels/frame$^2$ in the x direction and from 0.36 to 1.7 pixels/frame$^2$ in the y direction, since people tend to move more horizontally than vertically. The range of $\sigma_o$ can be wider, from 7.72 to 26.72 pixels along x and from 4 to 7 pixels along y. These estimations were then used to compute the steady-state values for the Kalman gain K.

Figure 3:
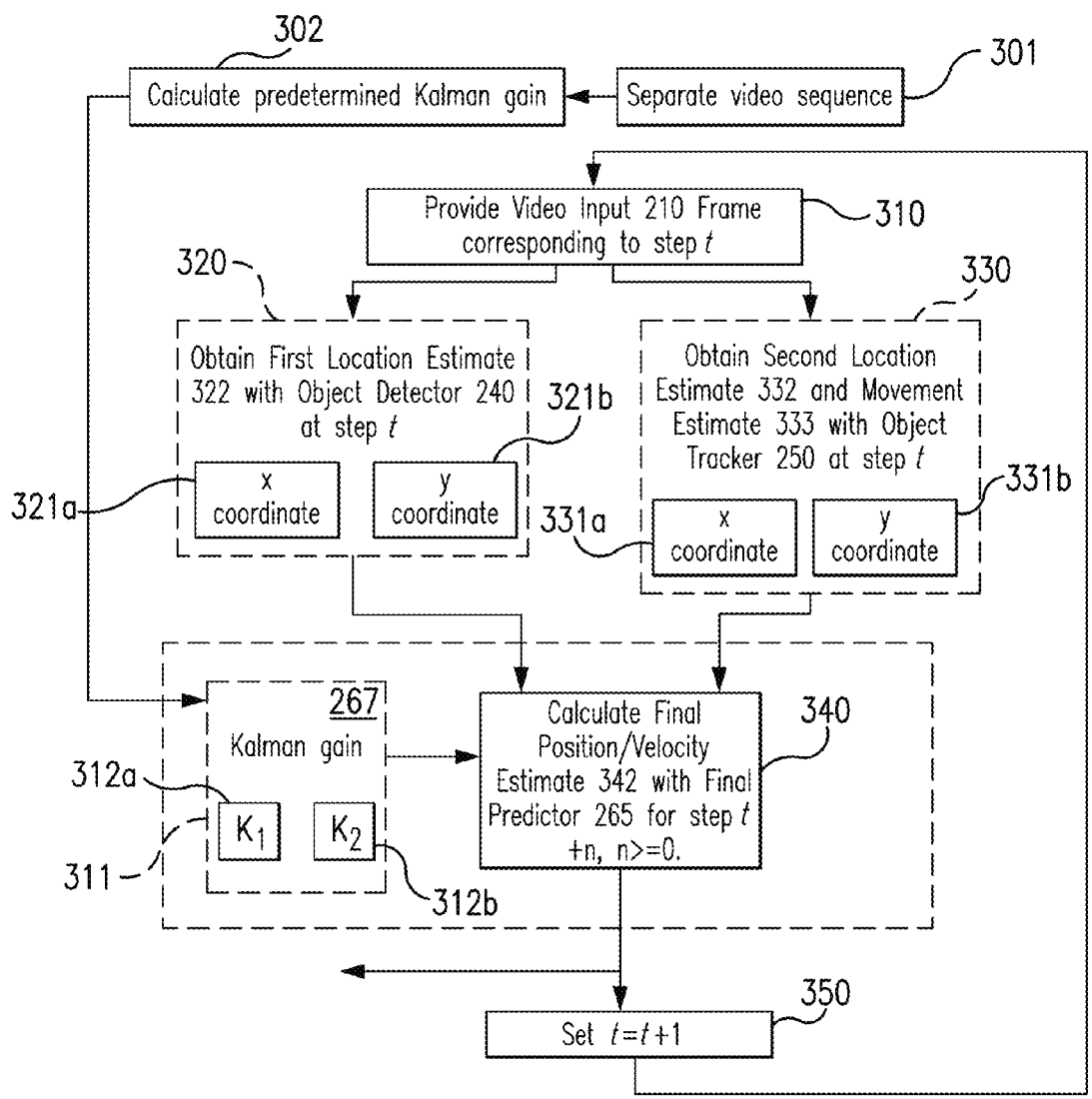
FIG. 3 is a flow diagram of a method for tracking objects according to another exemplary embodiment of the disclosed subject matter.

As illustrated by FIG. 6A, FIG. 6B, FIG. 6C, FIG. 6D, and FIG. 6E, which depict Kalman gain K as a function of frame, when adopting the regular Kalman framework, the steady-state and therefore a constant value for the K is quickly reached in all the sequences, thus justifying the use of this simplified assumption from the start in one embodiment disclosed herein (FIG. 3). The solid lines (601 to 622) in were obtained by applying a regular Kalman filter, using the ground truth Q and R values for each sequence. On the other hand, for each sequence, the dashed lines (623 to 642) represent the values of K estimated by adopting the steady-state assumption and the ground truth values of $\sigma_o$ and $\sigma_a$ computed from other, independent sequences, therefore a priori information about each specific clip was not exploited, but about object tracking behavior in general was. The substantial equivalence of the constant gains estimated with the two methods confirms the benefit of adopting the disclosed framework, since it allows to estimate valid values from K without any assumption about the measurement and prediction noise for the specific sequence to be analyzed.

In the following, the disclosed technique is denoted as K-Track and K-TrackBin. Those indicate two different strategies that were adopted in the case of multiple detections in the same frame to re-evaluate the value of K1. As mentioned the values of K were estimated based on the assumption of single measurements, since in the investigated videos there is only one object present for most of the time. In case of multiple detections, K-Track can select the detection closest to the prediction $\tilde{x}_t$, to be the observation $x_t^O$ to be combined according to $\hat{x}_t = K_1 x_t^O + 1 - K_1) \tilde{x}_t$. In can be considered that the probability that detections not related to the object of interest (either false detections or detections associated with other objects of the same class) could mislead the overall tracker is (to a first approximation) inversely proportional to the distance between the "correct" detection $x_t^O$ and second closest (to the predictor output) detection $x_t^{O2}$. In fact, $x_t^{O2}$ can be a distracter from the point of view of the tracker, and the closer it is to the output of the predictor (and the proper detection candidate), the higher the chances that it could be chosen by the tracker and could lead it away from its proper target. Taking into account that K1 fundamentally measures the trust of the overall tracker in its detector, the value of K1 can be computed to be proportional to the distance between $x_t^O$ and the second closest detection $x_t^{O2}$. The further the second and potentially confusing detection $x_t^{O2}$, the higher the confidence assigned to the measurement $x_t^O$, according to the following formula, where W and H are the frame width and height:

$$K1 = \frac{2|x_t^O - x_t^{O2}|}{WH}.$$

On the other hand, K-TrackBin simply considers multiple detections as an enormous increase in the measurement error variance, so therefore sets K1 to zero, trusting only the prediction $\tilde{x}_t$ according to $\hat{x}_t = K_1 x_t^O + (1-K_1)\tilde{x}_t$.

FIG. 7A, FIG. 7B, FIG. 7C, and FIG. 7D depict the pixel errors on each frame of the four face video sequences. The plots compare K-Track 701 and K-TrackBin 702 with MIL-Track 703, PROST 704 and Everingham 705. Again, in most sequences the disclosed technique outperforms the others.

Figure 8:
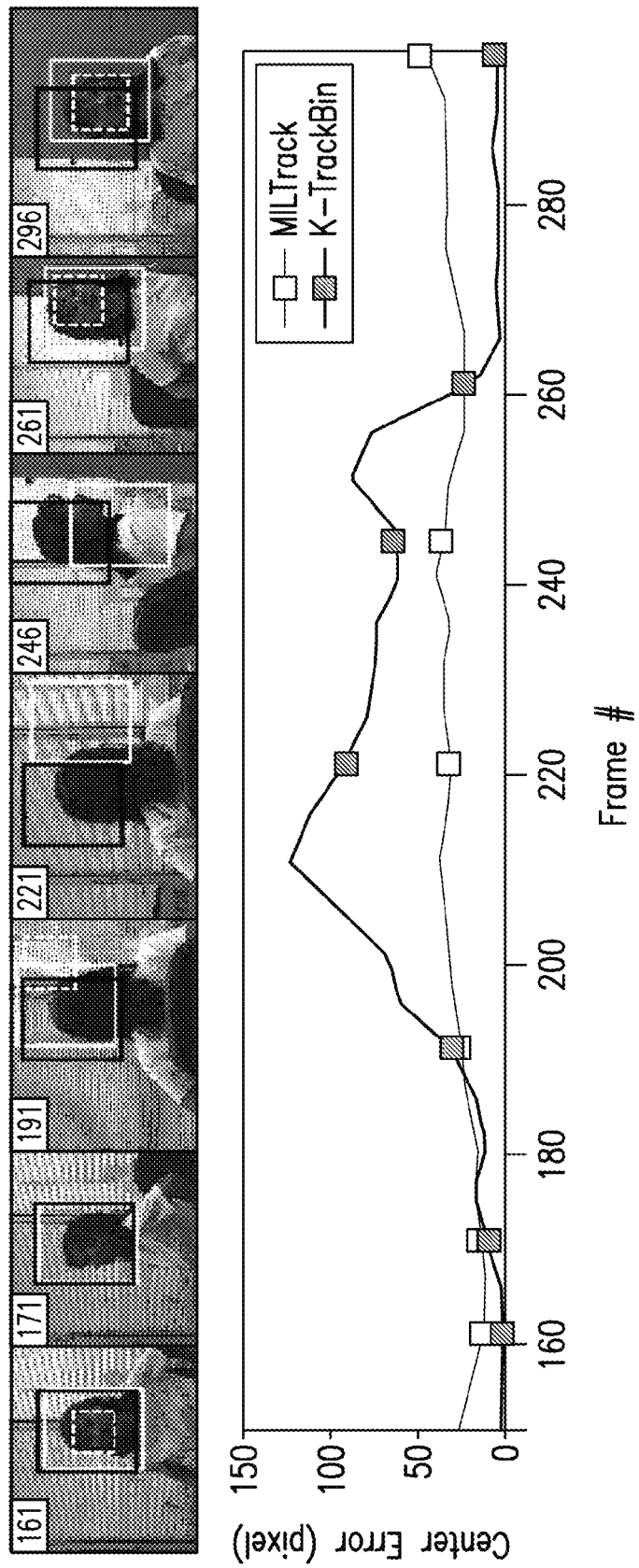
FIG. 8 illustrates the error observed in tracking a face according to an embodiment of the disclosed subject matter relative to a known method of tracking.
Figure 9:
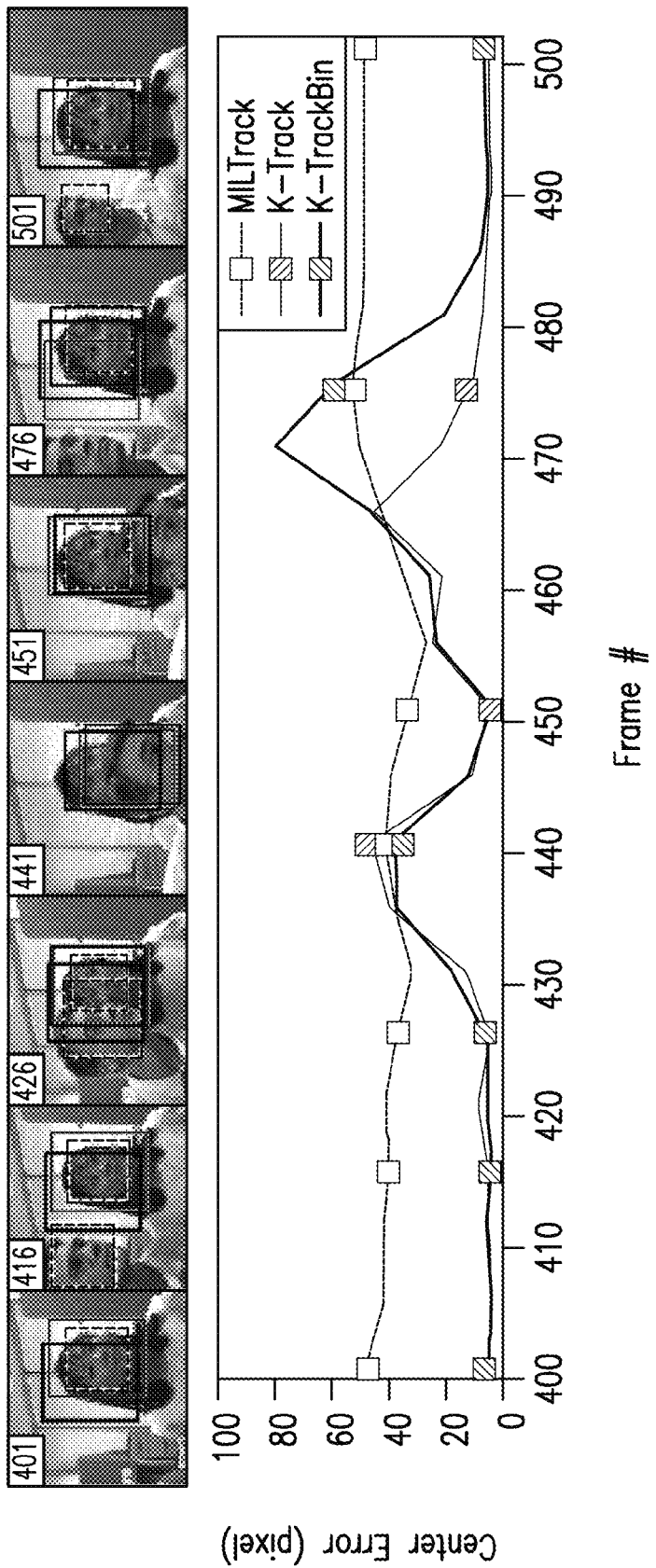
FIG. 9 illustrates the error observed in tracking a face where multiple faces are present according to embodiments of the disclosed subject matter relative to a known method of tracking.

In the Girl sequence, note that there are two intervals (frames 200 to 250 (750) and 430 to 470 (760)) in which the disclosed technique drives significantly away from the ground truth. The details of such intervals are reported in FIG. 8 and FIG. 9. In the first case the head of the person is rotating, therefore preventing De(x) from correctly finding a proper face. In the second case, another person enters the scene and multiple face detections are reported.

Figure 10A:
FIG. 10A and FIG. 10B depict a comparison of tracking precision of the method according to embodiments of the disclosed subject matter and known methods applied to tracking a bottle
Figure 10B:
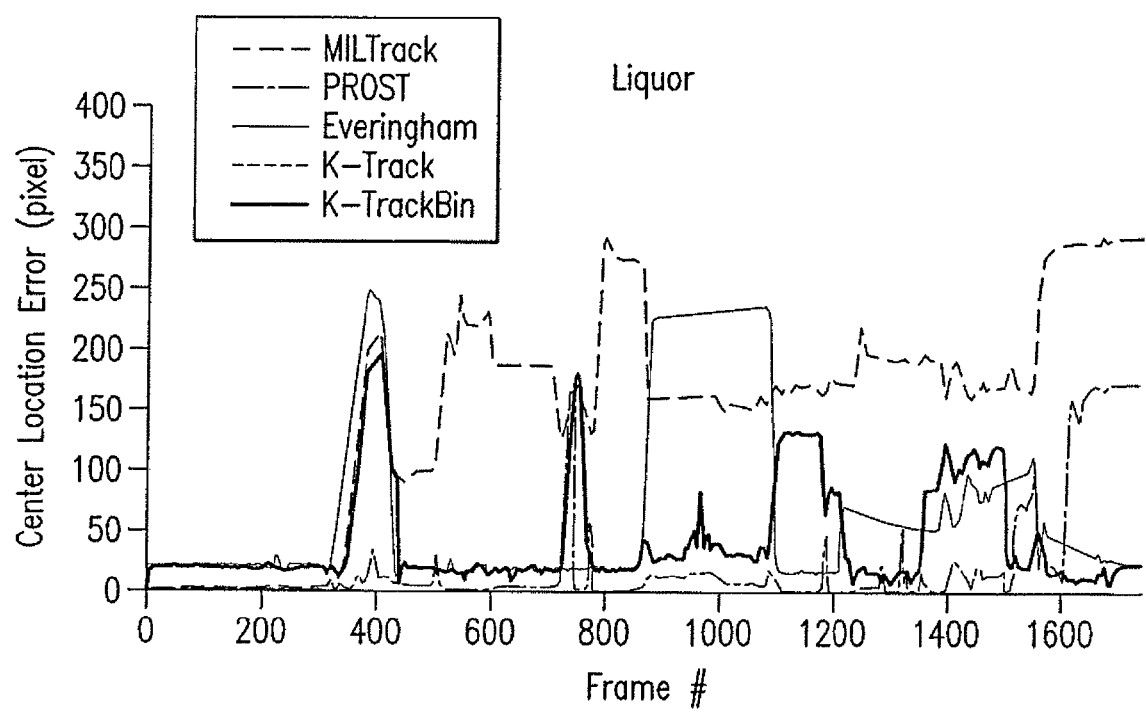

The examples on the Liquor sequence, results of which are illustrated in FIG. 10A and FIG. 10B, confirm the generality of the disclosed technique, as it can be extended to integrate any object tracker and detector.

For the Presentation videos, each of the three MPEG-1 videos in this set is approximately 45 minutes long, for a total of more than 2 hours of footage and one quarter of a million frames. The videos were recorded by non-professionals and are completely unedited. They also present challenges in that the camera is rarely steady, there are no clean cuts to identify shots, resolution is low and they lack structure. The ground truth center coordinates were manually labeled for all the face tracks in the videos.

For these videos the shot boundary and track seeds detection framework described herein was adopted. That is, once the seed has been established for a face track, tracking the face in both temporal directions is started, until the track exits the frame borders or one of the detected shots boundaries is encountered as depicted in FIG. 4.

Figure 11A:
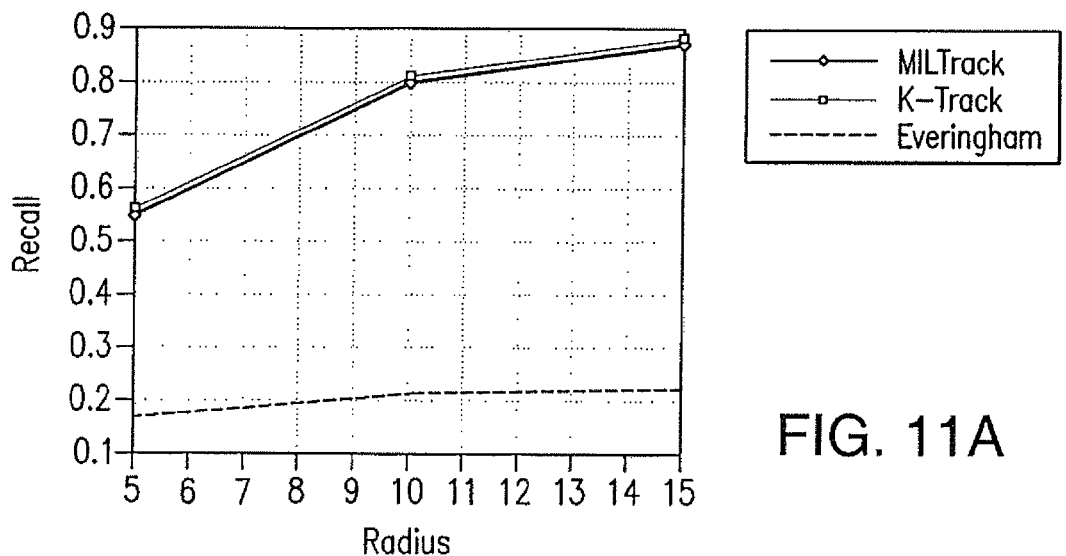
Figure 11B:
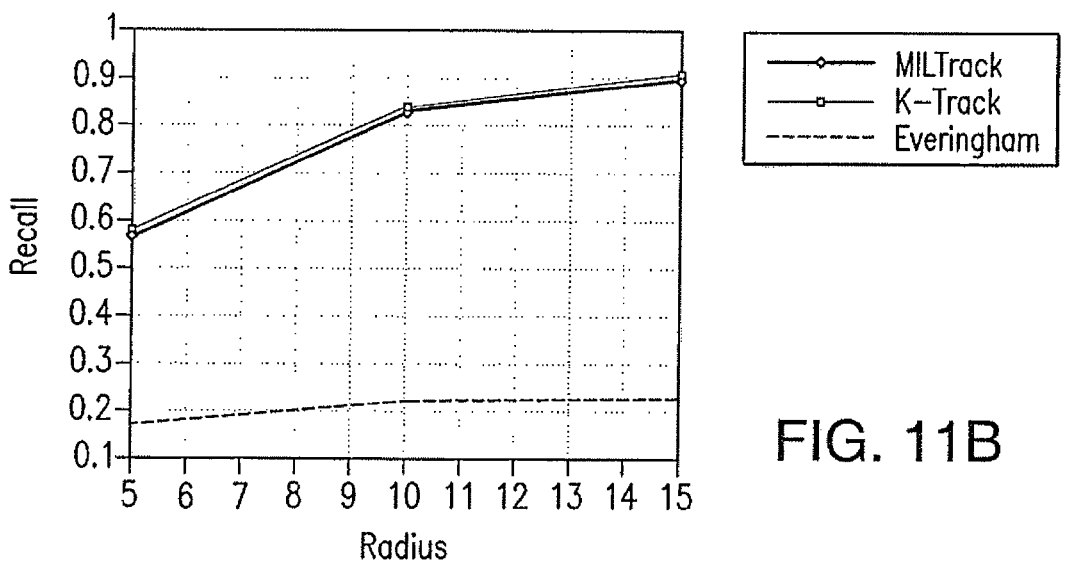
Figure 11C:
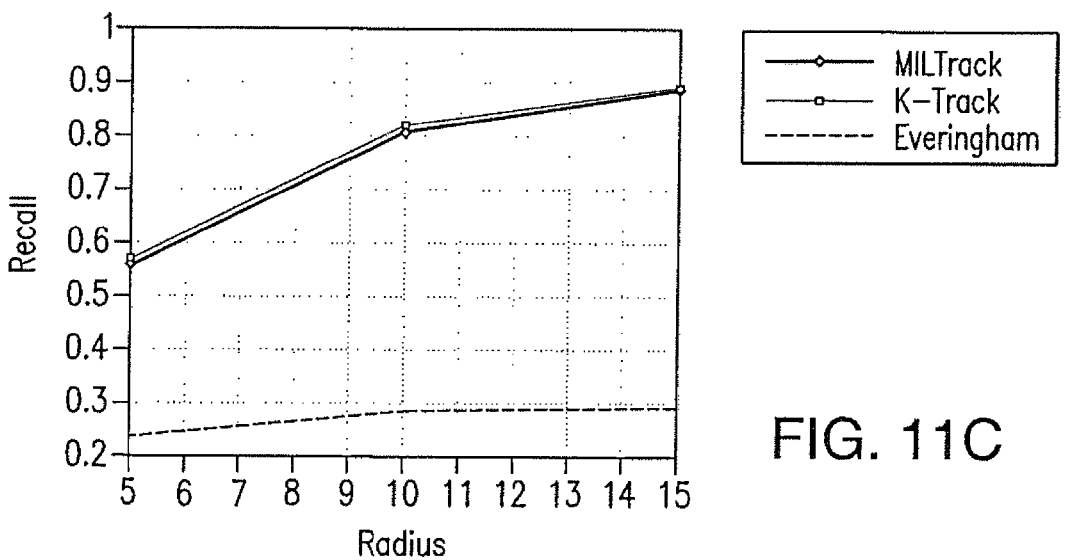
Figure 12A:
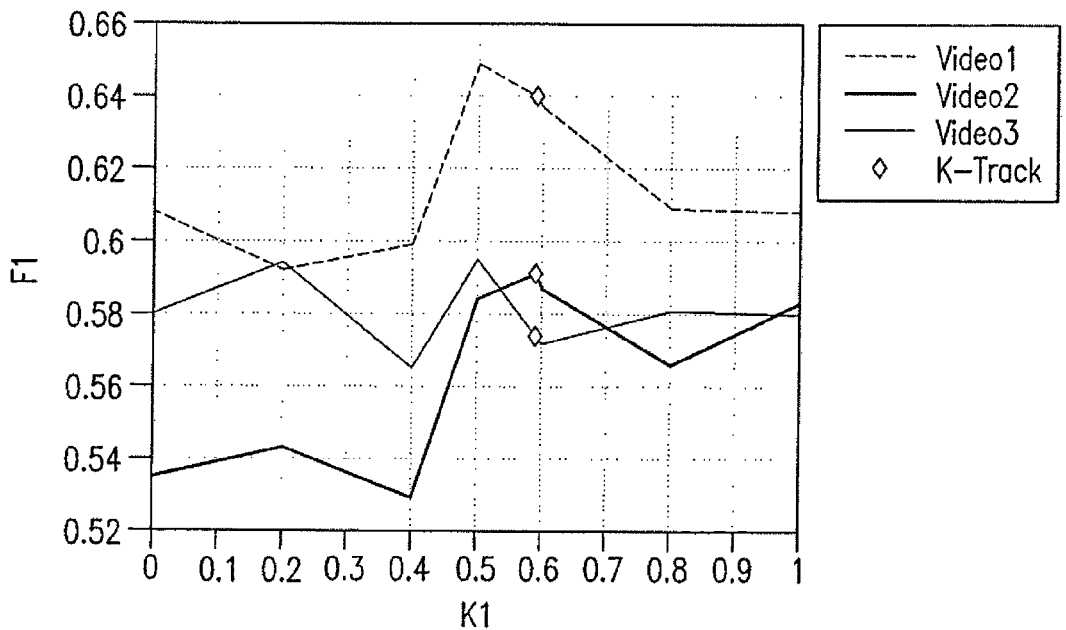
FIG. 12A, FIG. 12B, FIG. 12C, and FIG. 12D illustrate tracking performance of embodiments of the presently disclosed subject matter on presentation videos.
Figure 12B:
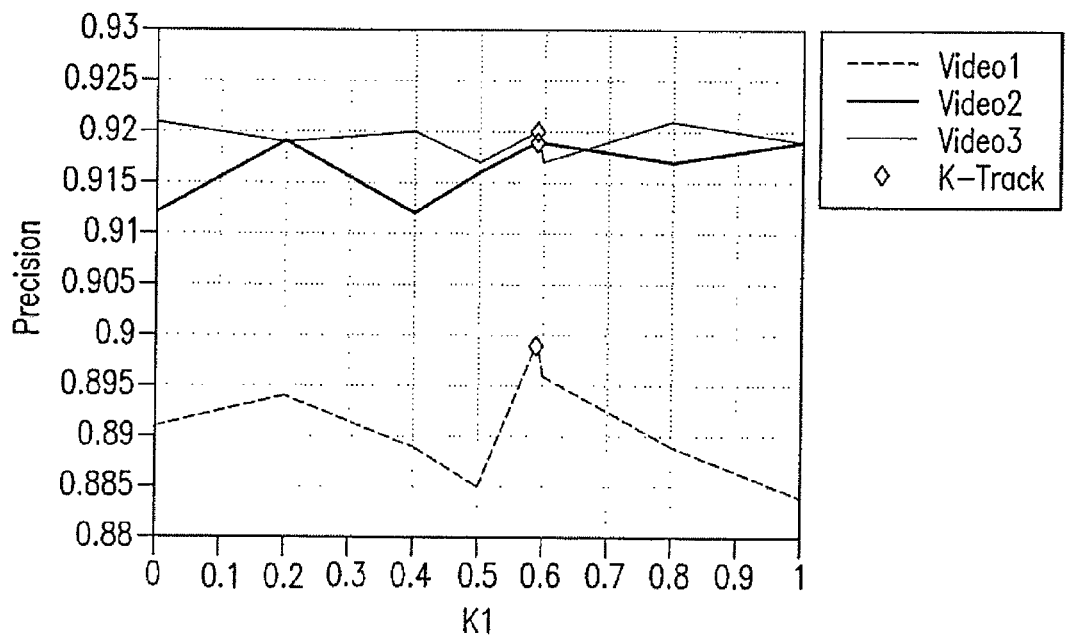
Figure 12C:
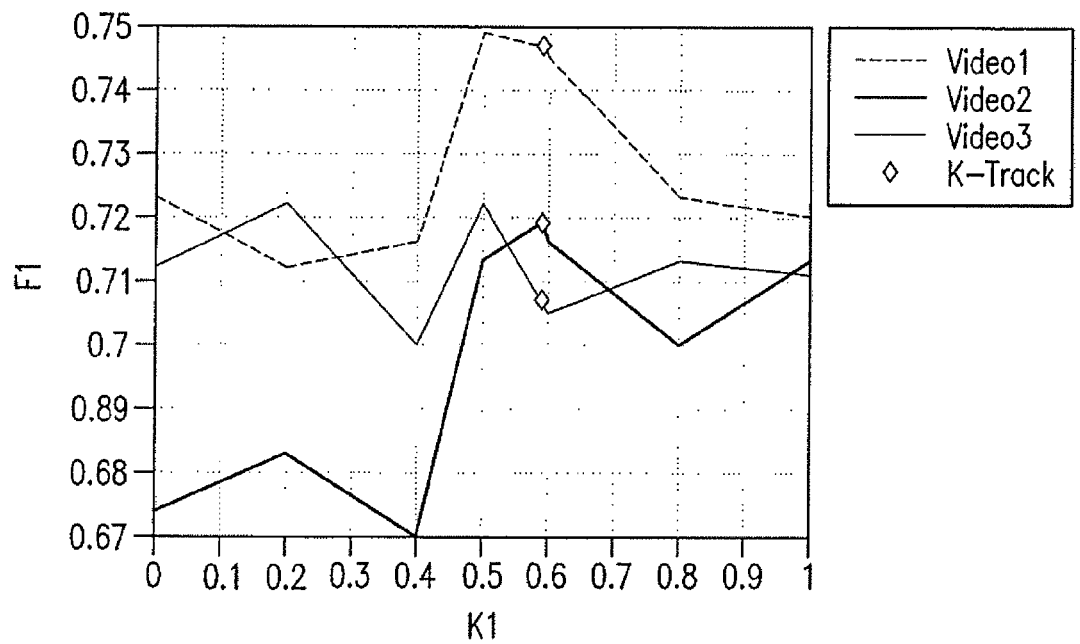
Figure 12D:
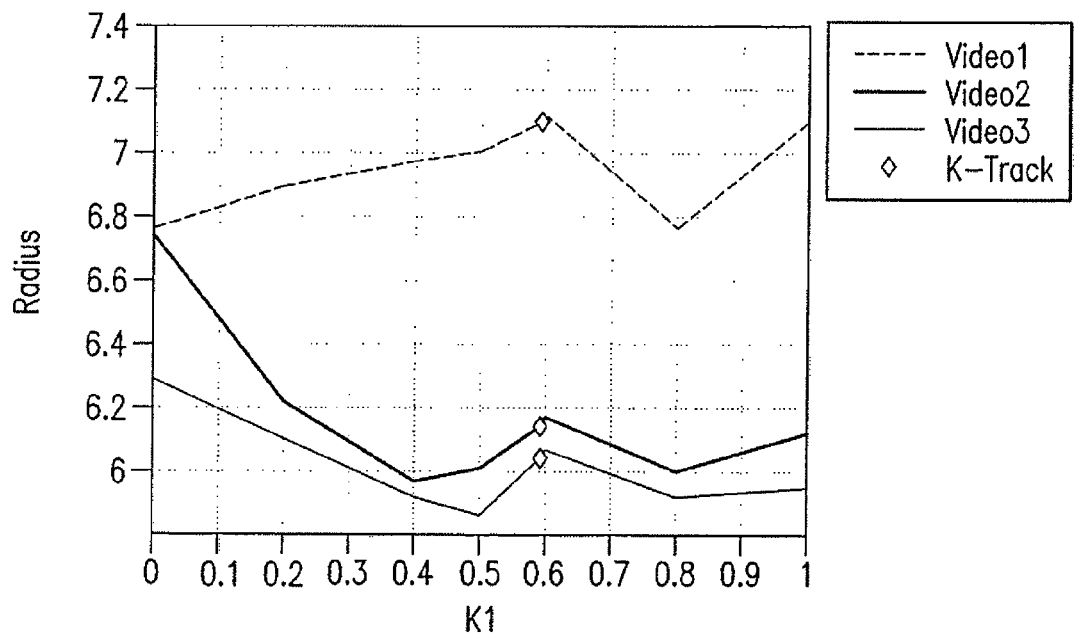

FIG. 11A, FIG. 11B, and FIG. 111C depict variation of tracking recall as the value of radius is incremented. Note the limited but consistent improvement in performance with respect to MILTrack in all videos, in particular for smaller values of radius.

The tracking performances on the Presentation videos is depicted in FIG. 12A, FIG. 12B, FIG. 12C, and FIG. 12D and confirm the benefit of adopting the disclosed Kalman framework. In FIG. 12 A, FIG. 12B, FIG. 12C, and FIG. 12D, tracking precision, recall, F1 and radius are presented as functions of the combination parameter K1 (fixed at the same value for x and y). The selected values The values of K1 selected by K-Track are highlighted with diamond markers and were estimated from the Standard sequences, therefore no parameter tuning was performed with respect to the investigated Presentation videos. The disclosed method using a Kalman filter and choice of K1 produces the best or close to best results in almost all cases for all performance measures.

Although the disclosed subject matter has been described in connection with particular embodiments thereof, it is to be understood that such embodiments are susceptible of modification and variation without departing from the disclosure. Such modifications and variations, therefore, are intended to be included within the spirit and scope of the appended claims.

The invention claimed is:

1. A computer-implemented method for tracking one or more objects at each position in an interval in a video input with the use of a Kalman filter having a noisy measurement component and a noisy predictor component, comprising:

obtaining a first location estimate of an object in the video input at each position in the interval, wherein the first location estimate represents the noisy measurement component of the Kalman filter;

obtaining a second location estimate and a movement estimate of the object in the video input at each position in the interval, wherein the second location estimate and movement estimate represent the noisy predictor component of the Kalman filter; and determining a final estimate of at least one selected from the group consisting of (1) a location of the object at a future interval at each position in the interval with the Kalman filter and (2) a velocity of the object at a future interval at each position in the interval with the Kalman filter, wherein each final estimate is determined with reference to a Kalman gain, the Kalman gain indicating a first level of importance of the noisy measurement component and a second level of importance of the noisy predictor component, and wherein the first location estimate, the second location estimate, and the movement estimate each comprise estimates having two dimensional components in a Cartesian coordinate system, the two dimensional components consisting of an x dimension and a y dimension.

2. The method of claim 1, wherein the Kalman filter uses a steady-state Kalman filter and uses a predetermined Kalman gain.

3. The method of claim 2, further comprising:

obtaining a first location estimate of an object in at least one separate video input at each position in an interval and determining a plurality of errors of the first location estimate;

obtaining a second location estimate and a movement estimate of the object in the at least one separate video input at each position in the interval and determining a plurality of errors of the second location estimate and movement estimate;

estimating the predetermined Kalman gain according to at least one variance of the plurality of errors of the first location estimate and at least one variance of the plurality of errors of the second location estimate and movement estimate.

4. The method of claim 1, wherein the first location estimate, the second location estimate, and the movement estimate each comprise estimates having a single dimensional component.

5. The method of claim 1, wherein the first location estimate, the second location estimate, and the movement estimate each comprise estimates having a plurality dimensional components.

6. The method of claim 1, wherein the x dimension and the y dimension of the first location estimate, the second location estimate, and the movement estimate are determined independently.

7. The method of claim 1, wherein the first location estimate represents a measurement $x_t^O$, where t is a position in the interval, wherein the second position estimate and movement estimate are represented by a prediction process $\tilde{x}_t$, and wherein determining the final estimate further comprises:

providing a predetermined Kalman gain K ($K_1$, $K_2$), where $K_1$ represents the first level of importance of the noisy measurement component, and where $K_2$ represents the second level of importance of the noisy predictor component;

determining an estimate of a position $x_t$ and an estimate of velocity $\dot{x}_t$, at each position t, where each component of the position is measured independently for an x coordinate and a y coordinate of the Cartesian space,
wherein the position x, and the velocity is determined according to the constraints $$\hat{x}_t = K_1 x_t^O + (1-K_1)\tilde{x}_t \text{ and } \hat{\dot{x}}_t = \dot{\tilde{x}}_t + K_2(x_t^O - \tilde{x}_t).$$

8. The method of claim 1, wherein the object comprises a human face.

9. A computer program product stored on a non-transitory computer readable storage device for tracking one or more objects at each position in an interval in a video input with the use of a Kalman filter having a noisy measurement component and a noisy predictor component, which when executed, causes a computer to perform a method, comprising:
  obtaining a first location estimate of an object in the video input at each position in the interval, wherein the first location estimate represents the noisy measurement component of the Kalman filter;
  obtaining a second location estimate and a movement estimate of the object in the video input at each position in the interval, wherein the second location estimate and movement estimate represent the noisy predictor component of the Kalman filter; and
  determining a final estimate of at least one selected from the group consisting of (1) a location of the object at a future interval at each position in the interval with the Kalman filter and (2) a velocity of the object at a future interval at each position in the interval with the Kalman filter,
  wherein each final estimate is determined with reference to a Kalman gain, the Kalman gain indicating a first level of importance of the noisy measurement component and a second level of importance of the noisy predictor component, and
  wherein the first location estimate, the second location estimate, and the movement estimate each comprise estimates having two dimensional components in a Cartesian coordinate system, the two dimensional components consisting of an x dimension and a y dimension.

10. The computer program product of claim 9, wherein the method further comprises:
  providing a display device;
  displaying on the display device a rendering of the video input and a plurality of information of the final estimate of position and/or velocity.

11. The computer program product of claim 9, wherein the rendering of the video input comprises a visual array of a plurality of frames of the input video, each of the plurality of frames corresponding to one position in the interval.

12. The computer product of claim 9, wherein the plurality of information is superimposed on the rendering of the video input.

13. An object tracking system for tracking one or more objects at each position in an interval in a video input with the use of a Kalman filter having a noisy measurement component and a noisy predictor component, comprising:
  at least one memory for storing the video input;
  at least one processor in communication with the at least one memory;
  an object detecting system comprising executable code stored in the at least one memory configured to instruct the at least one processor to obtain a first location estimate of an object in the video input at each position in the interval, wherein the first location estimate represents the noisy measurement component in the Kalman filter,
  and to obtain a second location estimate and a movement estimate of the object in the video input at each position in the interval, wherein the second location estimate and movement estimate represent the noisy predictor component in the Kalman filter; and
  a final estimate system comprising executable code stored in to the memory configured to instruct the at least one processor to determine a final estimate of a position and/or a velocity of the object at a future time at each position in the interval with the Kalman filter, wherein each final estimate is determined with reference to a Kalman gain, the Kalman gain indicating a first level of importance of the noisy measurement component and a second level of importance of the noisy predictor component, and wherein the first location estimate, the second location estimate, and the movement estimate each comprise estimates having two dimensional components in a Cartesian coordinate system, the two dimensional components consisting of an x dimension and a y dimension.

14. The system of claim 13, further comprising:
  a video capture device operatively connected to the at least one memory, whereby the video capture device captures the video input and stores the video input in the at least one memory.

15. The system of claim 13, further comprising:
  a display device operatively connected to the at least one processor, adapted to display a rendering of the video input and a plurality of information of the final estimate of position and/or velocity.

16. The method of claim 13, wherein the video input is generated from a video input device.

17. The method of claim 13, wherein the video input device is a security camera.

* * * * *